(12) United States Patent
Utsumi et al.

(10) Patent No.: US 11,593,690 B2
(45) Date of Patent: Feb. 28, 2023

(54) DATA PREDICTION SYSTEM AND DATA PREDICTION METHOD

(71) Applicant: HITACHI, LTD., Tokyo (JP)

(72) Inventors: Masato Utsumi, Tokyo (JP); Tohru Watanabe, Tokyo (JP); Ikuo Shigemori, Tokyo (JP); Youko Sakikubo, Tokyo (JP); Toshiyuki Sawa, Tokyo (JP); Hiroshi Iimura, Tokyo (JP); Hiroaki Ogawa, Tokyo (JP); Yoshihisa Okamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1120 days.

(21) Appl. No.: 16/307,407

(22) PCT Filed: May 16, 2017

(86) PCT No.: PCT/JP2017/018334
§ 371 (c)(1),
(2) Date: Dec. 5, 2018

(87) PCT Pub. No.: WO2017/212880
PCT Pub. Date: Dec. 14, 2017

(65) Prior Publication Data
US 2019/0303783 A1 Oct. 3, 2019

(30) Foreign Application Priority Data

Jun. 9, 2016 (JP) .............................. JP2016-115716
Dec. 5, 2016 (JP) .............................. JP2016-236173

(51) Int. Cl.
*G06N 7/00* (2006.01)
*G06F 17/15* (2006.01)
(Continued)

(52) U.S. Cl.
CPC ............... *G06N 7/00* (2013.01); *G06F 17/15* (2013.01); *G06K 9/6218* (2013.01); *G06K 9/6267* (2013.01); *G06Q 10/04* (2013.01)

(58) Field of Classification Search
CPC ............................... G06N 7/005; G06N 20/00
(Continued)

(56) References Cited

U.S. PATENT DOCUMENTS

2013/0013233 A1   1/2013   Murakami et al.
2014/0019397 A1*  1/2014   Alexander ............ H04W 4/029
                                                        706/46

FOREIGN PATENT DOCUMENTS

JP    H7-064965 A      3/1995
JP    2010-033559 A    2/2010
(Continued)

OTHER PUBLICATIONS

International Search Report for related International Application No. PCT/JP2017/018334 dated Jul. 11, 2017 English translation provided; 4 pages.
(Continued)

*Primary Examiner* — Sam K Ahn
*Assistant Examiner* — Gina M McKie
(74) *Attorney, Agent, or Firm* — Procopio, Cory, Hargreaves & Savitch LLP

(57) ABSTRACT

Provided is a data prediction system for predicting a future prediction value. The data prediction system has a data management device which manages data and a prediction operation device which models tendency of an error amount of a prediction operation result calculated on the basis of a correlation with a major explanatory variable and corrects a future prediction value. The data management device includes a storage unit which stores prediction target past measurement data observed with a time transition and
(Continued)

explanatory factor data explaining the prediction target past measurement data. The prediction operation device includes a first prediction operation unit which performs prediction on the basis of a correlation between the prediction target past measurement data and the explanatory factor data, a second prediction operation unit which models tendency of an error of an operation result of the first prediction operation unit and performs future error amount prediction of the operation result of the first prediction operation unit, and a correction unit which corrects the operation result of the first prediction operation unit by an operation result of the second prediction operation unit.

17 Claims, 21 Drawing Sheets

(51) Int. Cl.
  *G06K 9/62* (2022.01)
  *G06Q 10/04* (2012.01)

(58) Field of Classification Search
  USPC .......................................................... 706/52
  See application file for complete search history.

(56) References Cited

FOREIGN PATENT DOCUMENTS

| | | |
|---|---|---|
| JP | 2011-200040 A | 10/2011 |
| JP | 2013-005456 A | 1/2013 |
| JP | 2013-152656 A | 8/2013 |
| WO | 2014/155690 A1 | 10/2014 |
| WO | 2015/152941 A1 | 10/2015 |

OTHER PUBLICATIONS

Extended European Search Report dated Nov. 20, 2019 directed to the EP counterpart application No. 17810061.6 (9 pages).

* cited by examiner

FIG. 15
BEFORE CORRECTING PREDICTION VALUE BY
SECOND PREDICTION VALUE CORRECTION UNIT
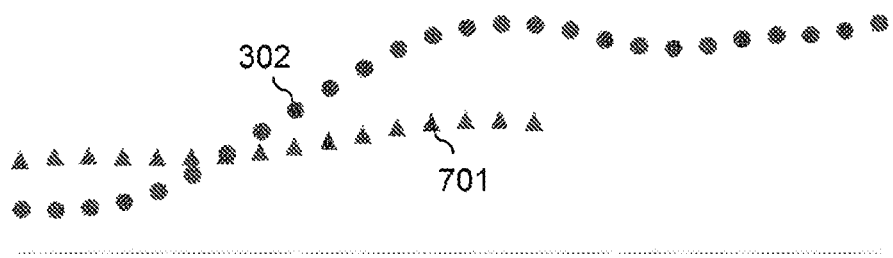
AFTER CORRECTING PREDICTION VALUE BY
SECOND PREDICTION VALUE CORRECTION UNIT
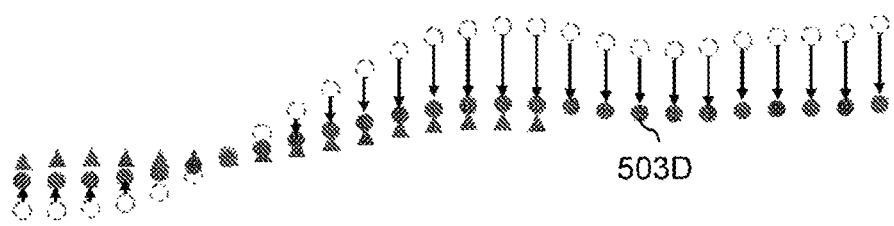

DATA PREDICTION SYSTEM AND DATA PREDICTION METHOD

TECHNICAL FIELD

The present invention relates to a data prediction system and a data prediction method.

BACKGROUND ART

In an energy business field such as a power business and a gas business, a communication business field, and a transportation business field such as a taxi business and a delivery business, a value of a future demand amount is predicted to perform a facility operation or a resource allocation according to demands of consumers.

However, due to the occurrence of various events causing variations in the demand amount, a difference occurs between a prediction value calculated at a certain time point and an actual observation value. Therefore, updating the prediction value newly on the basis of a newly observed value is important for highly accurate prediction.

As technology for performing the above prediction, JP 2013-5456 A (PTL 1) is disclosed. According to PTL 1, previous result data of the same pattern as a prediction target period is extracted from result data stored for each pattern that can be classified according to a day of the week. Coefficients included in a regression formula including a factor showing a weather condition and a load amount in variables are changed on the basis of the extracted data and a prediction value of the prediction target period is calculated using the regression formula having the changed coefficients. The prediction value is corrected using a difference between an actual measurement value and the prediction value. At the time of correction, a correction amount decreases as a time becomes earlier.

CITATION LIST

Patent Literature

PTL 1: JP 2013-5456 A

SUMMARY OF INVENTION

Technical Problem

According to the technology disclosed in PTL 1, it is assumed that it is possible to explain most of the transition of a future value of a prediction target by major explanatory factors such as preset outside air enthalpy, a wet bulb temperature, and a temperature. However, it is not uncommon to observe variations of values that cannot be explained by the set major explanatory variables, depending on data. The data is, for example, data for observing periodicity of data, such as a constant amount being observed at night, regardless of the temperature, inertia such as maintaining a constant air conditioning demand even if the temperature changes, variations due to unexpected events such as typhoons and events, and the like. For this data, prediction based on PTL 1 becomes difficult.

In addition, according to the technology disclosed in PTL 1, an assumption based on a model for a prediction error that cannot be explained by the above major explanatory factors is not made. Therefore, it is difficult to correct a relatively far future prediction value.

The present invention has been made in view of the above points and tendency of an error amount of a prediction operation result calculated on the basis of a correlation with major explanatory variables is modeled and the prediction operation result is corrected. An object of the present invention is to provide a data prediction system and data prediction that enable prediction of a future value of data having variations which are difficult to explain by major explanatory variables.

Solution to Problem

One of representative data prediction systems according to the present invention for solving the above problems is a data prediction system for predicting a future prediction value. The data prediction system has a data management device which manages data and a prediction operation device which models tendency of an error amount of a prediction operation result calculated on the basis of a correlation with a major explanatory variable and corrects a future prediction value. The data management device includes a storage unit which stores prediction target past measurement data observed with a time transition and explanatory factor data explaining the prediction target past measurement data. The prediction operation device includes a first prediction operation unit which performs prediction on the basis of a correlation between the prediction target past measurement data and the explanatory factor data, a second prediction operation unit which models tendency of an error of an operation result of the first prediction operation unit and performs future error amount prediction of the operation result of the first prediction operation unit, and a correction unit which corrects the operation result of the first prediction operation unit by an operation result of the second prediction operation unit.

Further, one of representative data prediction methods according to the present invention for solving the above problems is a data prediction method executed in a data prediction system for predicting a future prediction value. The data prediction system has a data management device which manages data and a prediction operation device which models tendency of an error amount of a prediction operation result calculated on the basis of a correlation with a major explanatory variable and corrects a future prediction value. The data prediction method includes: a first step of causing the data management device to store prediction target past measurement data observed with a time transition and explanatory factor data explaining the prediction target past measurement data; a second step of causing the prediction operation device to perform prediction on the basis of a correlation between the prediction target past measurement data and the explanatory factor data; a third step of causing the prediction operation device to model tendency of an error of a prediction operation result of the prediction and perform future error amount prediction of the prediction operation result; and a fourth step of causing the prediction operation device to correct the prediction operation result by an operation result of the error amount prediction.

Advantageous Effects of Invention

According to the invention, prediction including variation components which are difficult to explain by major explanatory variables is enabled. Other objects, configurations, and effects will become apparent from the following description of the embodiments.

BRIEF DESCRIPTION OF DRAWINGS

FIG. 15 is a diagram showing a concept of the fourth embodiment of the prediction value correction processing.

DESCRIPTION OF EMBODIMENTS

An embodiment of the present invention will be described in detail below with reference to the drawings.

Figure 1:
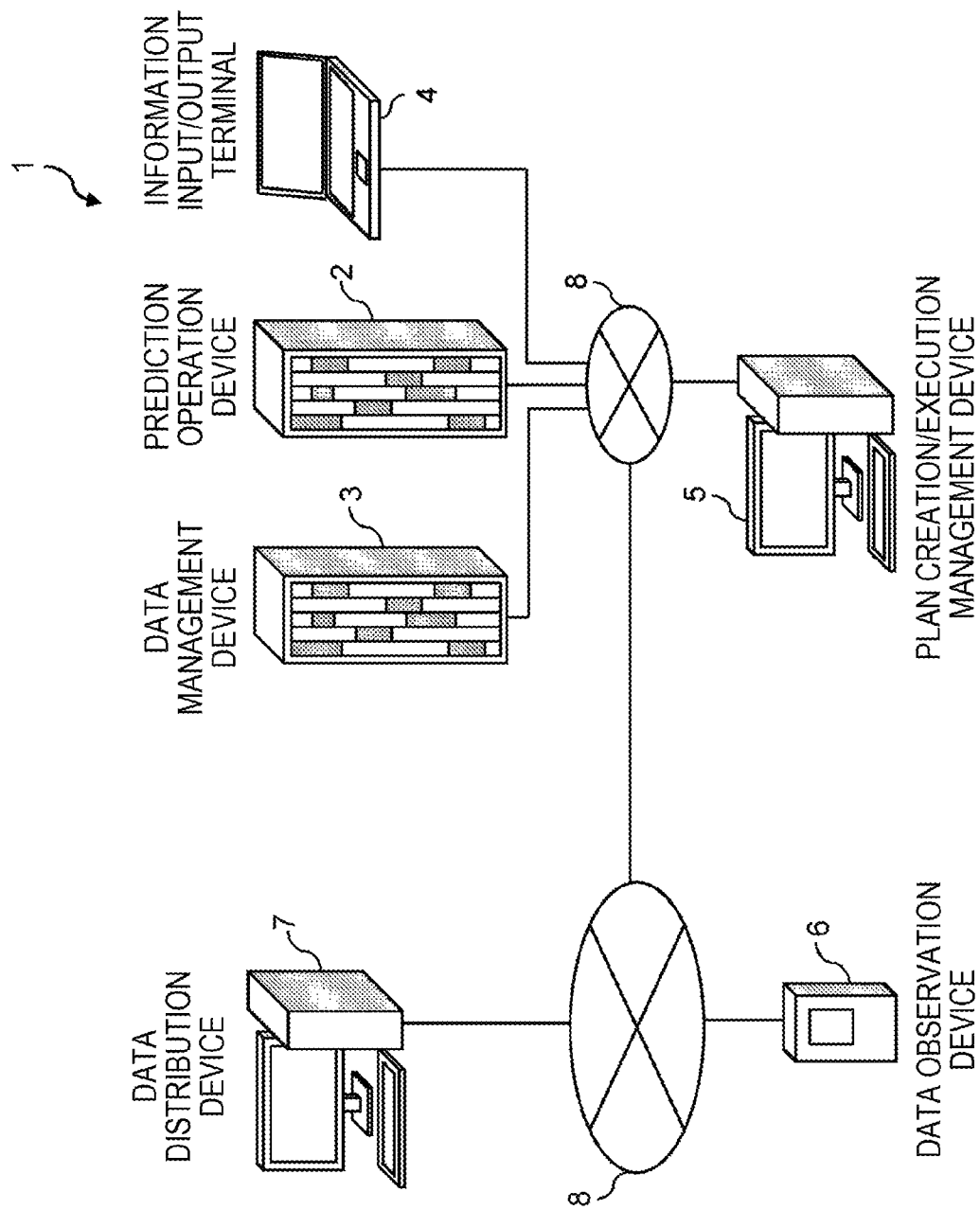
FIG. 1 is a diagram showing a device configuration according to a first embodiment of a data management system.

(1) First Embodiment (1-1) Configuration of Data Management System According to Present Embodiment FIG. 1 shows an entire configuration of a data management system 1 according to the present embodiment. The data management system 1 is a system for calculating a prediction value of an arbitrary future date and time on the basis of prediction target past measurement data and explanatory factor data capable of explaining the prediction target past measurement data and creating and executing a plan of operation and control of a physical facility on the basis of the calculated prediction value.

The data management system 1 includes a prediction operation device 2, a data management device 3, a plan creation/execution management device 5, an information input/output terminal 4, a data observation device 6, and a data distribution device 7. In addition, a communication path 8 is, for example, a local area network (LAN) or a wide area network (WAN) and is a communication path for connecting various devices and terminals constituting the data management system 1 to communicate with each other.

The data management device 3 stores the prediction target past measurement data observed with a time transition and the explanatory factor data capable of explaining the prediction target past measurement data from a past date and time preset through the information input/output terminal 4 to a latest observation date and time.

In addition, the data management device 3 performs searching and transmission according to a data acquisition request from other device. The prediction target past measurement data is, for example, energy consumption amount data of power, gas, water, or the like in a unit of a meter or a unit of a plurality of meters, communication amount data of a certain communication base station, operation number data of mobile objects such as taxies every hour, or the like.

The explanatory factor data is data such as weather data such as a temperature, a humidity, a solar radiation amount, a wind speed, and an atmospheric pressure, data showing presence or absence of occurrence of unexpected events such as typhoons and events, and prediction target past measurement data such as the number of consumers of energy and the number of communication terminals connected to the communication base station. In addition, the explanatory factor data is data capable of explaining a value of the prediction target past measurement data such as the prediction target past measurement data.

The prediction operation device 2 performs prediction on the basis of a correlation between the prediction target past measurement data and the prediction explanatory factor data stored in the data management device 3. Further, the prediction operation device 2 models tendency of a first prediction error. In addition, the prediction operation device 2 corrects result data of a first prediction operation unit from a second prediction operation unit performing prediction of a future error amount of first prediction and result data of the second prediction operation unit.

In addition to the future prediction value of the prediction target past measurement data, the result data of the first prediction operation unit and the second prediction operation unit or the first prediction operation result and the corrected data by the second prediction operation result include data of a section showing a variation width of the prediction value. The result data of the first prediction operation unit and the second prediction operation unit or the first prediction operation result and the corrected data by the second prediction operation result include data of a model formula for calculating the prediction value and a coefficient value thereof.

The plan creation/execution management device 5 creates and executes an operation plan of a physical facility to achieve a predetermined target, on the basis of the prediction operation result data generated and output by the prediction operation device 2. Here, the physical facility and the operation plan thereof are a plan for satisfying a predicted future energy demand value or an energy demand plan value created on the basis of the predicted future energy demand value, for example, in an energy field.

Specifically, the physical facility and the operation plan thereof are a plan for the number of starting generators and an output allocation of the generators or a plan for allocating a flow rate and a pressure of gas or water flowing to a gas pipe or a water pipe, for example, in the energy field.

The physical facility and the operation plan thereof are a plan for controlling the number of communication terminals connected to each communication base station so as not to exceed the capacity of the communication base station, for example, in a communication field. The physical facility and the operation plan thereof are a plan for dispatching taxies capable of satisfying the predicted number of users, for example, in a transportation field.

It should be noted that the operation plan of the facility is not limited to direct execution by the subject using the plan creation/execution management device 5 and may be indirectly realized. An indirect facility operation is an operation of a physical facility by others based on direct relative transaction contracts or transaction contracts through exchanges, for example, in a power field. In this case, an execution plan of the transaction contract corresponds to the operation plan of the facility.

The information input/output terminal 4 inputs data to the prediction operation device 2, the data management device 3, and the plan creation/execution management device 5 and displays data stored or output by these devices. The data observation device 6 regularly measures the prediction target past measurement data and the prediction explanatory factor data at predetermined time intervals and transmits the data to the data distribution device 7 or the data management device 3. The data distribution device 7 stores the data received from the data observation device 6 and transmits the data to either the data management device 3 or the prediction operation device 2 or both the devices.

(1-2) Internal Configuration of Device

Figure 2:
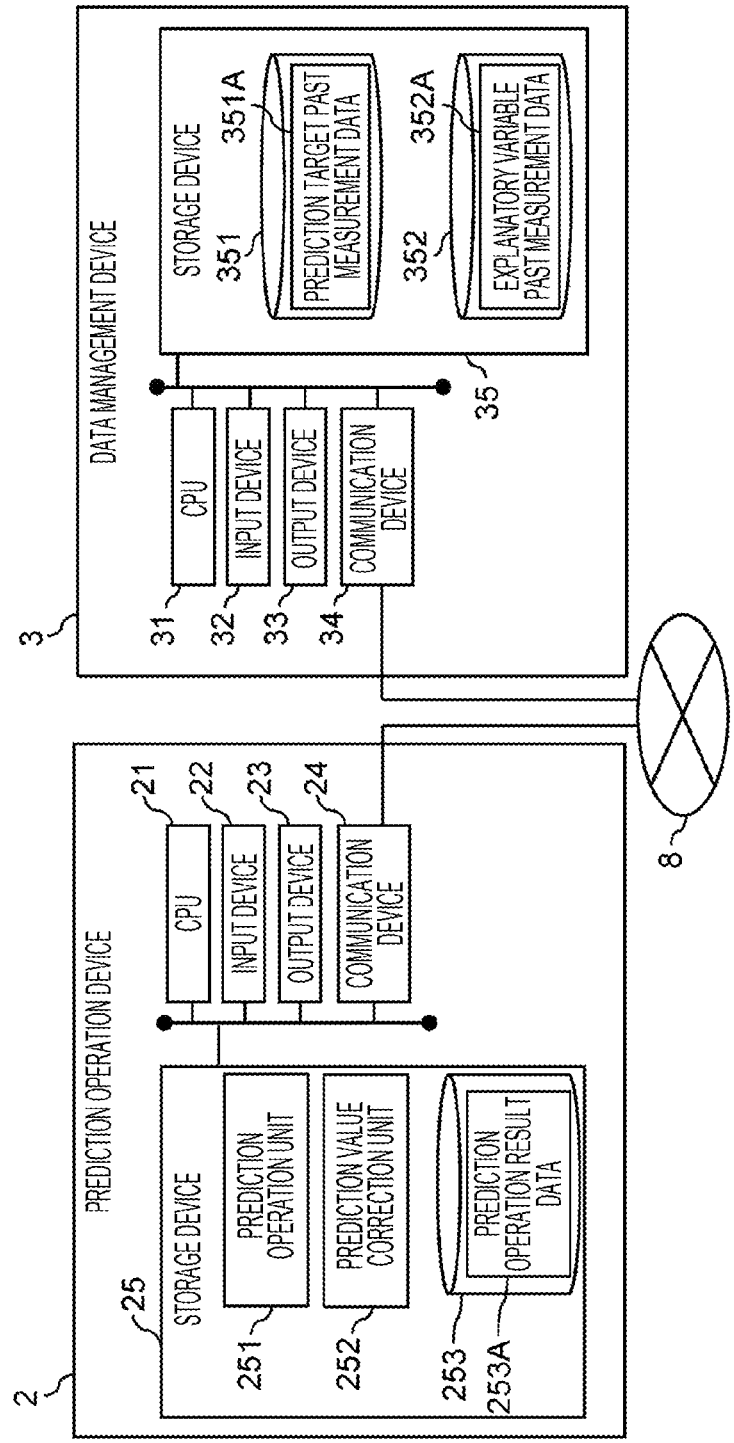
FIG. 2 is a diagram showing a functional configuration according to a first embodiment of a data prediction system.

FIG. 2 shows a functional configuration of each device constituting a data prediction system 12 (FIG. 3) in the data management system 1. The data prediction system 12 includes the prediction operation device 2 and a data management device 3.

The data management device 3 includes a central processing unit (CPU) 31, an input device 32, an output device 33, a communication device 34, and a storage device 35 that generally control an operation of the data management device 3. The data management device 3 is, for example, an information processing device such as a personal computer, a server computer, or a handheld computer.

The input device 32 includes a keyboard or a mouse and the output device 33 includes a display or a printer. The communication device 34 is configured to include a network interface card (NIC) for connection with a wireless LAN or a wired LAN. The storage device 35 is a storage medium such as a random access memory (RAM) or a read only memory (ROM). An output result or an intermediate result of each processing unit may be appropriately output via the output device 33.

The storage device 35 stores databases such as a prediction target past measurement data storage unit 351 and an explanatory variable past measurement data storage unit 352. Prediction target past measurement data 351A is held in the prediction target past measurement data storage unit 351.

The prediction target past measurement data 351A is a past value of data to be predicted by the prediction operation device 2, which is measured at predetermined time intervals such as 30-minute intervals, for example. The prediction target past measurement data 351A is data including energy consumption amount data of power, gas, water, or the like in a unit of a meter or a unit of a plurality of meters, communication amount data of a certain communication base station, operation number data of mobile objects such as taxies every hour, or the like.

Explanatory variable past measurement data 352A is held in the explanatory variable past measurement data storage unit 352. The explanatory variable past measurement data 352A is a past value of explanatory factor data capable of explaining an increase or decrease in the value of the prediction target past measurement data 351A, which is measured at predetermined time intervals such as 30-minute intervals, for example.

The explanatory variable past measurement data 352A is data including data such as weather data such as a temperature, a humidity, a solar radiation amount, a wind speed, and an atmospheric pressure, data showing presence or absence of occurrence of unexpected events such as typhoons and events, and the like. The explanatory variable past measurement data 352A is data including the prediction target past measurement data 351A such as the number of consumers of energy and the number of communication terminals connected to the communication base station or the prediction target past measurement data 351A.

The prediction operation device 2 includes a central processing unit (CPU) 21, an input device 22, an output device 23, a communication device 24, and a storage device 25 that generally control an operation of the prediction operation device 2. The prediction operation device 2 is, for example, an information processing device such as a personal computer, a server computer, or a handheld computer.

Various computer programs such as a prediction operation unit 251 and a prediction value correction unit 252 are stored in the storage device 25. The prediction operation unit 251 calculates the first prediction operation result data 302 (FIG. 3) on the basis of a correlation between the prediction target past measurement data 351A and the explanatory variable past measurement data 352A.

The prediction operation unit 251 calculates a difference or the like on the basis of the prediction target past measurement data 351A including a latest measurement value, thereby calculating a prediction error and modeling tendency of occurrence of the prediction error. As a result, the prediction operation unit 251 calculates an error amount of first prediction at an arbitrary future time point and corrects the first prediction operation result with the calculated future error amount.

In the storage device 25, a database such as a prediction operation result data storage unit 253 is stored. Prediction operation result data 253A is held in the prediction operation result data storage unit 253.

The prediction operation result data 253A is a prediction operation result calculated by the prediction operation unit 251 and is data including a representative value such as an expectation value of the prediction operation result, section data such as a prediction reliable section and a prediction section, a model formula used for prediction and coefficients thereof, and the like. A second prediction operation unit 251B (FIG. 3) to perform error sequence prediction is included in the prediction operation unit 251.

(1-3) Overall Processing and Data Flow of Data Prediction System According to Present Embodiment Referring to FIGS. 3 and 4, the processing and data flow of the data prediction system 12 in the present embodiment will be described.

A data flow of data prediction processing of the data prediction system 12 in the present embodiment will be described with reference to FIG. 3.

The data management device 3 receives the explanatory variable past measurement data 352A transmitted from the data observation device 6 or the data distribution device 7 and stores it in the explanatory variable past measurement data storage unit 352.

In addition, the data management device 3 stores the prediction target past measurement data 351A transmitted from the data observation device 6 or the data distribution device 7, in the prediction target past measurement data storage unit 351.

The explanatory variable past measurement data 352A is data capable of explaining a value of the prediction target past measurement data 351A, such as weather data such as a temperature, a humidity, a solar radiation amount, a wind speed, and an atmospheric pressure and data showing presence or absence of occurrence of unexpected events such as typhoons and events.

The explanatory variable past measurement data 352A is data capable of explaining a value of the prediction target past measurement data 351A, such as data of the number of generation sources of the prediction target past measurement data 351A such as the number of consumers of energy and the number of communication terminals connected to the communication base station and the prediction target past measurement data 351A.

The prediction target past measurement data 351A is, for example, energy consumption amount data of power, gas, water, or the like in a unit of a meter or a unit of a plurality of meters, communication amount data of a certain communication base station, operation number data of mobile objects such as taxies every hour, or the like.

The prediction operation device 2 acquires the prediction target past measurement data 351A and the explanatory variable past measurement data 352A stored in the data management device 3. The prediction operation device 2 predicts a future value at an arbitrary time point by the first prediction operation unit 251A and additionally stores the prediction operation result data 253A in the prediction operation result data storage unit 253.

Further, the prediction operation device 2 inputs the prediction target past measurement data 351A stored by the data management device 3 and the latest observation data 303 transmitted from the data observation device 6 to the second prediction operation unit 251B. The prediction operation device 2 calculates a first prediction error from a predetermined past date and time and models tendency of occurrence of the error, thereby predicting an error amount of an arbitrary future date and time of the first prediction.

In addition, the prediction operation device 2 inputs second prediction operation result data 304 output from the second prediction operation unit 251B and the first prediction operation result data 302 output from the first prediction operation unit 251A to the prediction value correction unit 252.

The prediction operation device 2 corrects the first prediction operation result data 302 by the second prediction operation result data 304, outputs third prediction operation result data 305, and transmits it to the plan creation/execution management device 5.

In addition to the future prediction value of the prediction target past measurement data 351A, the first, second, and third prediction operation result data 302, 304, and 305 include data of a section showing a variation width of the prediction value or data of a model formula for calculating the prediction value and coefficient values thereof.

A processing procedure of the data prediction processing of the data prediction system 12 in the present embodiment will be described with reference to FIG. 4. This processing is processing starting when the prediction operation device 2 receives an input operation from a device user or when a time becomes the execution time preset through the information input/output terminal 4 and processing from step S401 to step S404 is executed by the prediction operation device 2.

Actually, the processing is executed on the basis of various computer programs stored in the CPU 21 and the storage device 25 of the prediction operation device 2 and various computer programs stored in the CPU 31 and the storage device 35 of the data management device 3. For the convenience of explanation, the processing subjects will be described as the prediction operation device 2 and the various computer programs of the prediction operation device 2.

First, the first prediction operation unit 251A of the prediction operation unit 251 acquires and receives the prediction target past measurement data 351A and the explanatory variable past measurement data 352A from the data management device 3. Next, the first prediction operation unit 251A calculates the first prediction operation result data 302 at a plurality of future time points preset through the information input/output terminal 4, on the basis of a correlation between a value of the prediction target past measurement data 351A and a value of an explanatory variable such as a calendar day and weather information of the explanatory variable past measurement data 352A. Thereafter, the first prediction operation unit 251A additionally records it in the prediction operation result data 253A of the prediction operation result data storage unit 253 (S401).

A known method may be applied to a method used by the first prediction operation unit 251A at the time of performing the prediction. The known method is, for example, a prediction method (prediction system) based on an arithmetic mean value of a similar past period (similar day or the like) preset through the information input/output terminal 4 on the basis of the day of the week or the temperature. As the known method, a prediction method using a single regression model or a multiple regression model, a prediction method using a neural network, or a prediction method using time-series analysis such as an AR model or an ARIMA model is exemplified.

Further, as a method used at the time of performing the prediction, a method of setting only a lag having a statistically significant correlation as an order in model order identification in the time-series analysis may be used. An example of a specific embodiment of the first prediction operation unit 251A will be described later.

Next, the second prediction operation unit 251B of the prediction operation unit 251 obtains a prediction value from the first prediction operation result data 302 of a predetermined past period from the prediction operation result data 253A. In addition, the second prediction operation unit 251B acquires an actual measurement value of the same period from the prediction target past measurement data 351A or the latest observation data 303 acquired from the data observation device 6. The second prediction operation unit 251B calculates first prediction error data (error sequence 310) as a difference between the prediction value and the actual measurement value (S402).

A model of tendency of occurrence of the error is created from the calculated first prediction error data and an error amount of the first prediction in a predetermined future period is calculated as the second prediction operation result data 304 from the created model (S403). A method used by the second prediction operation unit 251B at the time of performing the prediction is the same as the method described above used by the first prediction operation unit 251A at the time of performing the prediction and the explanation thereof will be omitted here.

Finally, the prediction value correction unit 252 corrects the first prediction operation result data 302 calculated by the first prediction operation unit 251A, on the basis of the second prediction operation result data 304 calculated by the second prediction operation unit 251B, and calculates the third prediction operation result data 305 (S404). Specifically, for example, the first prediction operation result data 302 is corrected by adding the prediction value of the second prediction operation result data 304 to the prediction value of the first prediction operation result data 302.

With the above processing, the data prediction processing in the present embodiment ends.

(1-4) Details of Each Component

Figure 5:
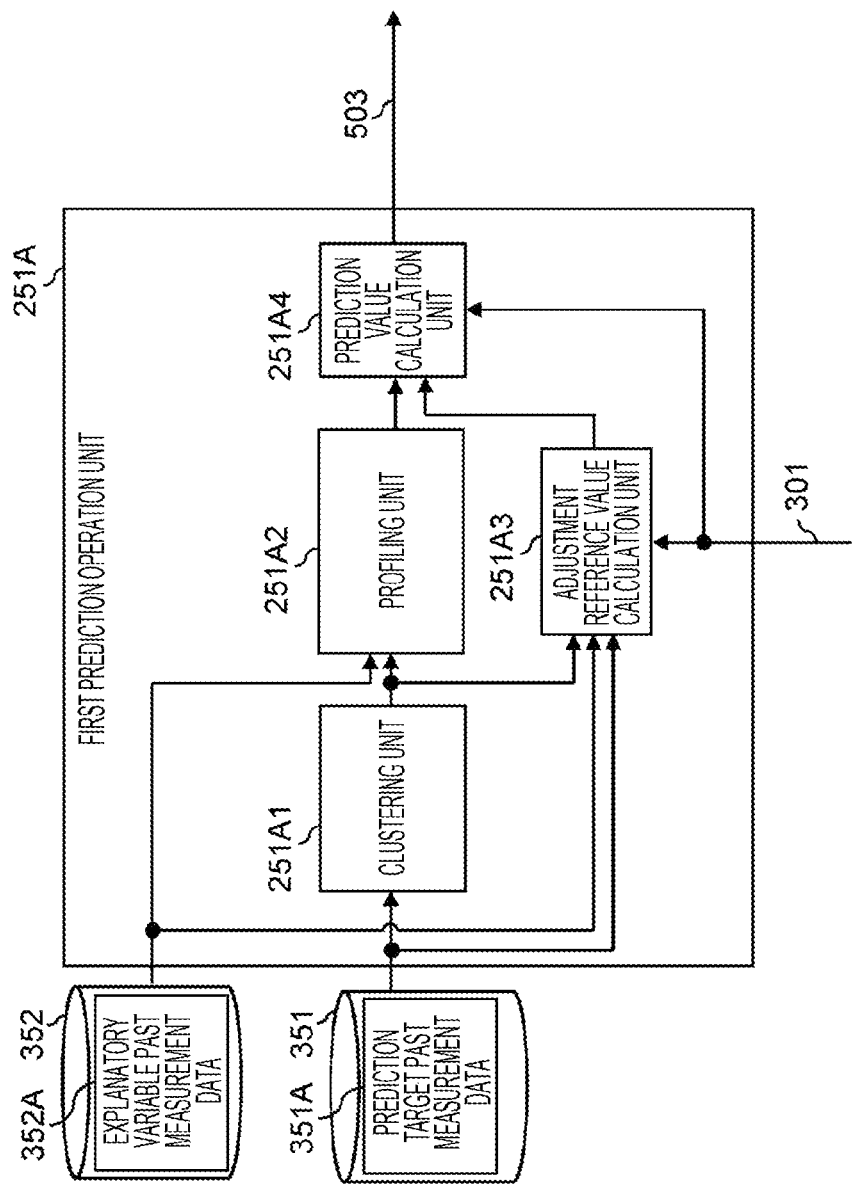
FIG. 5 is a diagram showing a data flow according to a first embodiment of prediction operation processing.
Figure 6:
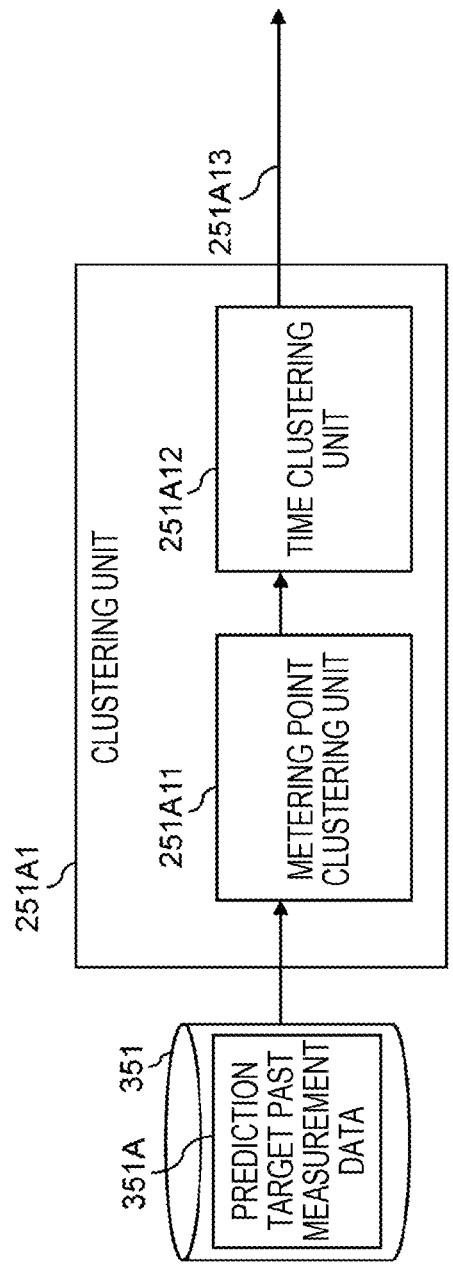
FIG. 6 is a diagram showing a data flow according to a second embodiment of the prediction operation processing.

Referring to FIGS. 5 and 6, a first embodiment of the first prediction operation unit 251A of the data prediction system 12 in the present embodiment will be described.

(1-4-1) First Prediction Operation Unit

FIG. 5 shows a data flow of the first prediction operation unit 251A according to the present embodiment. The prediction operation according to the present embodiment is characterized by calculating a sequence of the prediction target past measurement data 351A in a prediction target period, on the basis of a periodic feature amount of the prediction target past measurement data 351A.

(1-4-1-1) Clustering Unit

A data classification unit (hereinafter, referred to as a clustering unit) 251A1 acquires, from the prediction target past measurement data 351A, the prediction target past measurement data 351A of a past period preset through the information input/output terminal 4, for example, the past year or the like and classifies data from the viewpoint of a metering point and a time on the basis of the periodic feature amount. The clustering unit 251A1 includes a metering point clustering unit 251A11 that classifies the data from the viewpoint of the metering point and a time clustering unit 251A12 that classifies the data from the viewpoint of the time (FIG. 6).

The metering point refers to a building in which a meter for measuring data, a person carrying the meter, a thing (such as a taxi mounted with a GPS) where the meter is installed, or a building where the meter is installed, as an object.

A flow of processing of the clustering unit 251A1 will be specifically described using FIG. 6. First, the metering point clustering unit 251A11 acquires, from the prediction target past measurement data 351A, the prediction target past measurement data 351A of the preset past period, for example, the past year or the like through the information input/output terminal 4.

Next, the metering point clustering unit 251A11 processes the acquired data into time-series data of metering point granularity preset through the information input/output terminal 4. The metering point granularity is, for example, granularity of each meter, a total of granularity of all meters, or a unit of a plurality of meters preset through the information input/output terminal 4 on the basis of external information and the like associated with each meter, such as an area and a contract type.

A feature amount showing a periodic feature of each metering point granularity data is calculated using frequency analysis such as a Fourier transform and a wavelet transform and clustering processing is performed on the calculated feature amount. By the above processing, metering points having similar waveform shapes of time-series data in the past year, for example, are classified as metering point clusters.

The time clustering unit 251A12 first calculates a total value of the prediction target data for each measurement time, for each of the metering point clusters generated by the metering point clustering unit 251A11, and generates time-series data of the total value.

Next, the time clustering unit 251A12 divides the generated time-series data of the total value for each metering point cluster by time granularity preset through the information input/output terminal 4. The time granularity is, for example, granularity of a 24-hour unit, granularity of 1 year, or granularity of an arbitrary time preset through the information input/output terminal 4. For the time granularity, the same granularity may be applied in all the metering point clusters or may be different for each metering point cluster.

In addition, the time clustering unit 251A12 calculates a feature amount showing a periodic feature from data divided by the time granularity using the frequency analysis such as the Fourier transform and the wavelet transform and performs clustering processing on the calculated feature amount.

By the above processing, metering points having similar waveform shapes of time-series data in the past year, for example, are classified as metering point clusters. Further, clustering result data 251A13 in which periods where waveform shapes of a 24-hour unit of time-series data of the total value of each of the classified metering point clusters are similar are classified as time clusters is output.

A known method may be applied to the clustering processing performed by the metering point clustering unit 251A11 and the time clustering unit 251A12. As the known method, k-means to be an unsupervised clustering algorithm of neighboring optimization, an EM algorithm, or spectral clustering is exemplified.

As the known method, unsupervised support vector machine (SVM) to be an unsupervised clustering algorithm of optimization of an identification surface, a VQ algorithm, or self-organizing maps (SOM).

When the number of clusters to be classified is determined, an index such as a data similarity degree and a data aggregation degree in the cluster calculated by a variance in each cluster or a separation degree of the cluster calculated by a distance between the clusters may be used.

Before calculating the feature amount showing the periodic feature of the time-series data by the metering point clustering unit 251A11 and the time clustering unit 251A12, normalization processing may be performed to exclude information of the magnitude of a value of the time-series data.

The normalization processing may perform normalization such that a mean becomes 0 and a variance becomes 1, for example. By calculating the feature amount showing the periodic feature from the normalized time-series data, clustering based on only the similarity of the waveform shapes of the time-series data can be performed. The above is the first embodiment of the clustering unit 251A1.

(1-4-1-2) Profiling Unit

A data generation unit (hereinafter, referred to as a profiling unit) 251A2 uses the clustering result data 251A13 and the explanatory variable past measurement data 352A output by the clustering unit 251A1. As a result, the profiling unit 251A2 specifies an explanatory variables commonly existing in each time cluster of the clustering result data 251A13 and calculates a range of a value thereof.

Specifically, the profiling unit 251A2 uses an identifier such as a number or a name for specifying each time cluster as a teacher label. In addition, the profiling unit 251A2 calculates the explanatory variable commonly existing in each time cluster of each metering point cluster and the range of the value thereof as profiling result data, by using a decision tree learning algorithm such as CART, ID3, and random forest.

It should be noted that calculation processing of the profiling result data is processing in which emphasis is placed on the time-series data of the past period having a high correlation with the prediction period, for example. Specifically, a weight value to place emphasis on the time-series data of the past period having the high correlation with the prediction period is applied to the decision tree learning algorithm such as CART, ID3, and random forest.

Here, the past period having the high correlation with the prediction period is, for example, a most recent past day of the prediction target day or a past day of the same season as the prediction target day when there is seasonal periodicity in the variation of the prediction target. That is, a weight value Wi for data of a past day i is given as a function of a prediction period and a correlation Ci as represented by the following formula.

[Formula 1]

$$W_i = f(C_i) \tag{1}$$

Figure 20:
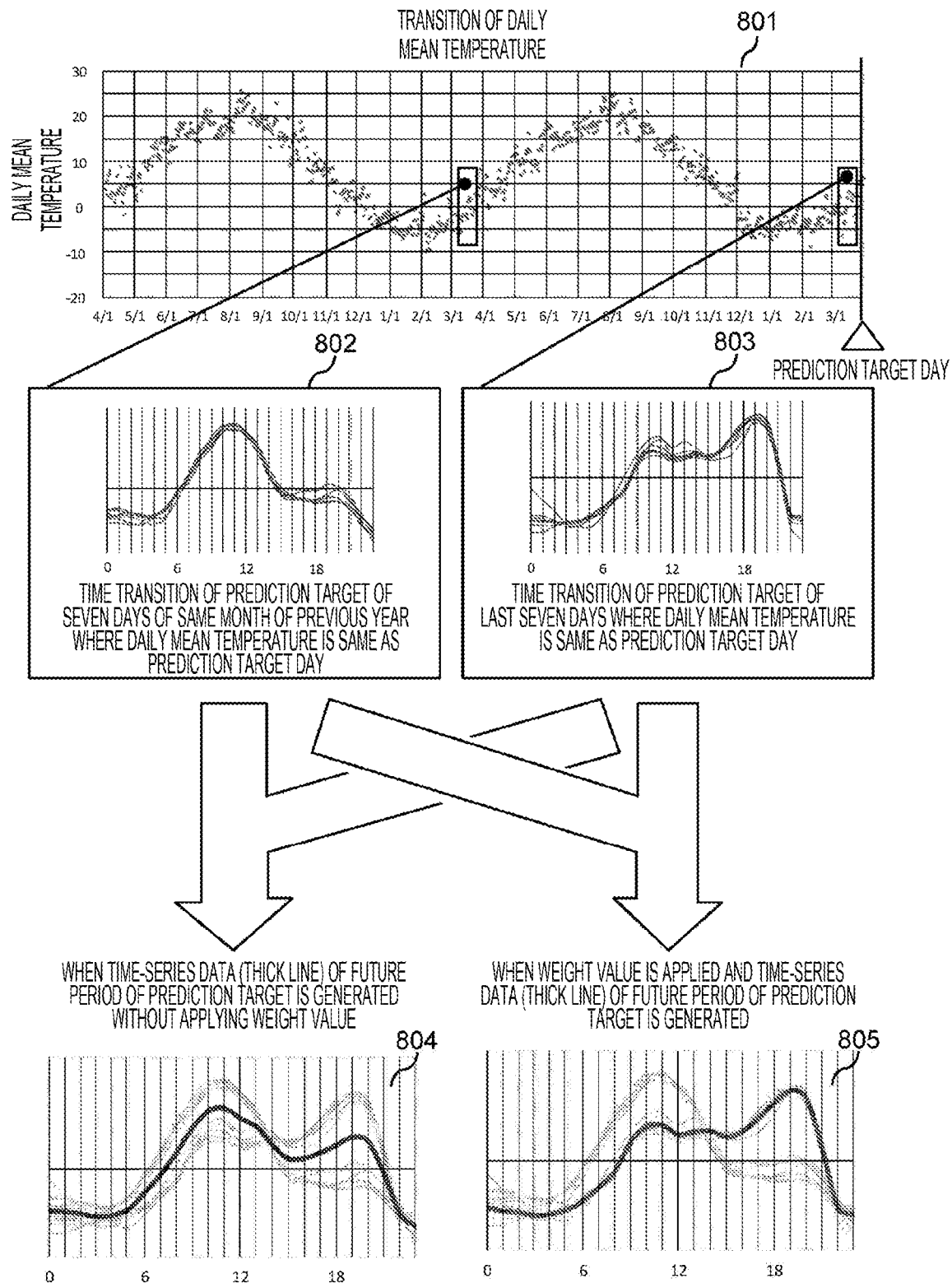
FIG. 20 is a conceptual diagram showing an effect of the data prediction system.

FIG. 20 shows a conceptual diagram of an effect. Here, it is assumed that, as a result of the processing in the profiling unit 251A2, an attribute of a daily mean temperature among explanatory variables commonly existing in each time cluster is a dominant explanatory variable.

As shown in a graph 801 of the daily mean temperature over the whole year, time-series data of a future period of the prediction target is generated from the past time-series data of the prediction target at the same season and the same mean temperature as the prediction target day.

In a graph 803 for the most recent seven days in which the daily mean temperature is the same as the prediction target day, an aspect of a time transition of each day is aged with respect to a graph 802 of seven days of the same month of the previous year where the daily mean temperature is the same as the prediction target day. Here, if the time-series data of the future period of the prediction target is generated without applying the weight value, it may be generated as a mean before and after aging as shown by a thick line in a graph 804.

When the weight value is applied, data closer to an aspect of a recent time transition after aging is generated as shown by a thick line in a graph 805. As described above, time-series data of a future period of a prediction target to be described later can be generated as data reflecting aging of the prediction target more accurately. Here, although the case where the profiling unit 251A2 generates the data is described, the data may be acquired from the outside.

(1-4-1-3) Prediction Value Calculation Unit

A prediction value calculation unit 251A4 generates a prediction value of the time-series data of the future period of the prediction target, on the basis of the clustering result data 251A13, the profiling result data, and the explanatory variable data 301 to be the explanatory variable data. The explanatory variable data 301 includes a prediction value to be an expectation value of an explanatory variable relating to the future period as a prediction target.

Specifically, the prediction value calculation unit 251A4 determines a time cluster which it is predicted that the waveform shape of the time-series data of the prediction target period belongs to, on the basis of the profiling result data and the explanatory variable data 301. In addition, representative time-series data is generated from the past data belonging to the determined time cluster, for example, by an arithmetic mean for each time.

Generation processing of the representative time-series data is performed for each metering point cluster. For the representative time-series data of each of the metering point clusters, for example, an extreme value such as a maximum value in the morning and a minimum value in the afternoon is predicted by an adjustment reference value calculation unit 251A3.

By adjusting the representative time-series data so that a difference between a predicted extreme value and the extreme value of the representative time-series data is minimized, a time-series prediction value of the prediction target period of each metering point cluster is calculated and is output as first prediction operation result data 503. The first prediction operation result data 503 may be used as one piece of series data obtained by summing the time-series prediction values of the prediction target periods of the respective metering point clusters with the same date and time values.

(1-4-1-4) Adjustment Reference Value Calculation Unit

The adjustment reference value calculation unit 251A3 predicts extreme values such as a maximum value in the morning and a minimum value in the afternoon, in representative time-series data of each time cluster of each metering point cluster. This prediction is performed on the basis of the prediction target past measurement data 351A, the explanatory variable past measurement data 352A, and the clustering result data 251A13 output from the clustering unit 251A1.

Specifically, the case of a metering point cluster will be described. First, prediction target past measurement data of a period preset through the information input/output terminal 4 such as the past year in the metering point belonging to the metering point cluster is acquired from the prediction target past measurement data 351A.

Next, total value time series of the metering point clusters is generated by totaling the acquired data for each time, and the generated total value time series is divided by time granularity set at the time of generating the time cluster of the metering point cluster. Each divided data is classified on the basis of a day type such as a month, a day of the week, a weekday, and a holiday and all actual observation values of respective extreme values of the classified data are calculated. A model for predicting the extreme values using the single regression model or the multiple regression model is generated by using the actual observation values of the calculated extreme values and past actual observation values of the explanatory variables such as the temperature.

Prediction values of the extreme values of the prediction target period are calculated using a finally generated model and input to the prediction value calculation unit 251A4. With the above processing, the first prediction operation processing in the present embodiment ends.

(1-4-1-5) Modification of First Prediction Operation Unit

The embodiment in which the value calculated by the adjustment reference value calculation unit 251A3 is used as the extreme value of the prediction target period such as the maximum value in the morning and the minimum value in the afternoon has been described. However, the present invention is not limited thereto and the value may be an integration value of the prediction target data of the prediction target period (an embodiment in which the integration value is calculated).

In the case of the embodiment in which the integration value is calculated, the data input to the adjustment reference value calculation unit 251A3 is time-series data of an integration value of the prediction target past measurement data 351A for each period and time-series data of a representative value such as an integration value and a mean value of the explanatory variable past measurement data 352A for each period.

The processing of the embodiment in which the value calculated by the adjustment reference value calculation unit 251A3 is the integration value of the prediction target data in the prediction target period is the same as the processing of the embodiment in which the value calculated by the adjustment reference value calculation unit 251A3 is the extreme value in the prediction target period.

In the case of the embodiment in which the integration value is calculated, the prediction value calculation unit 251A4 outputs the first prediction operation result data 503. The prediction value calculation unit 251A4 adjusts the prediction value of the representative time-series data such that a residual sum of squares of the integration value of the prediction values of the representative time-series data in the prediction target period and the integration value in the prediction target period is minimized.

The integration value of the prediction values of the representative time-series data input to the prediction value calculation unit 251A4 is calculated by the clustering unit 251A1 and the profiling unit 251A2. The integration value in the prediction target period, input to the prediction value calculation unit 251A4, is calculated by the adjustment reference value calculation unit 251A3.

(1-4-1-6) Another Modification of First Prediction Operation Unit

A new metering point may be added with the passage of time or an existing metering point may be removed. Particularly, this corresponds to the case of a metering point where there is no measurement value of the past time-series data for the newly added metering point or the case in which, even when there is a measurement value, the number of measurement data is smaller than those of the other metering points. In this case, the newly added metering point and the other metering points cannot be subjected to the clustering processing at the same time by the metering point clustering unit 251A11 and the measuring point cluster to which the newly added measuring point belongs cannot be specified.

Therefore, a feature amount showing a periodic feature of time-series data of the newly added metering point cluster obtained at the present time point is calculated. Processing for causing a new metering point to belong to a metering point cluster having a feature amount closest to the feature amount may be performed. The metering point cluster having the closest feature amount is calculated by performing determination using a feature amount of a cluster center (center point of the cluster) of each metering point cluster in the same period, already calculated by the metering point clustering unit 251A11 according to the scale such as the Euclidean distance. It should be noted that the above processing may be performed at arbitrary timing or at constant time intervals.

In addition, in the metering point cluster to which the new metering point is added, the scale of the data to be predicted may be greatly different in the past time point such as one year ago and the prediction target day, like the case where the scale of the measurement value of the newly added metering point is large or the case where the number of metering points to be added is large. This causes a problem that the prediction result of the extreme value or the integration value predicted by the adjustment reference value calculation unit 251A3 cannot be appropriately calculated.

In this case, first, time-series data of a newly added metering point in a past non-measurement period is estimated from the representative time-series data of the metering point cluster calculated from the mean time-series data of the metering point clusters or a center of gravity of the feature amount of the metering point cluster. After adding the estimated past time-series data to the past time-series data of the measuring point belonging to the metering point cluster, a prediction operation of the extreme value or the integration value in the adjustment reference value calculation unit 251A3 is performed. As a result, the prediction result of the extreme value or the integration value can be appropriately calculated.

(1-4-2) Second Prediction Operation Unit

Figure 7:
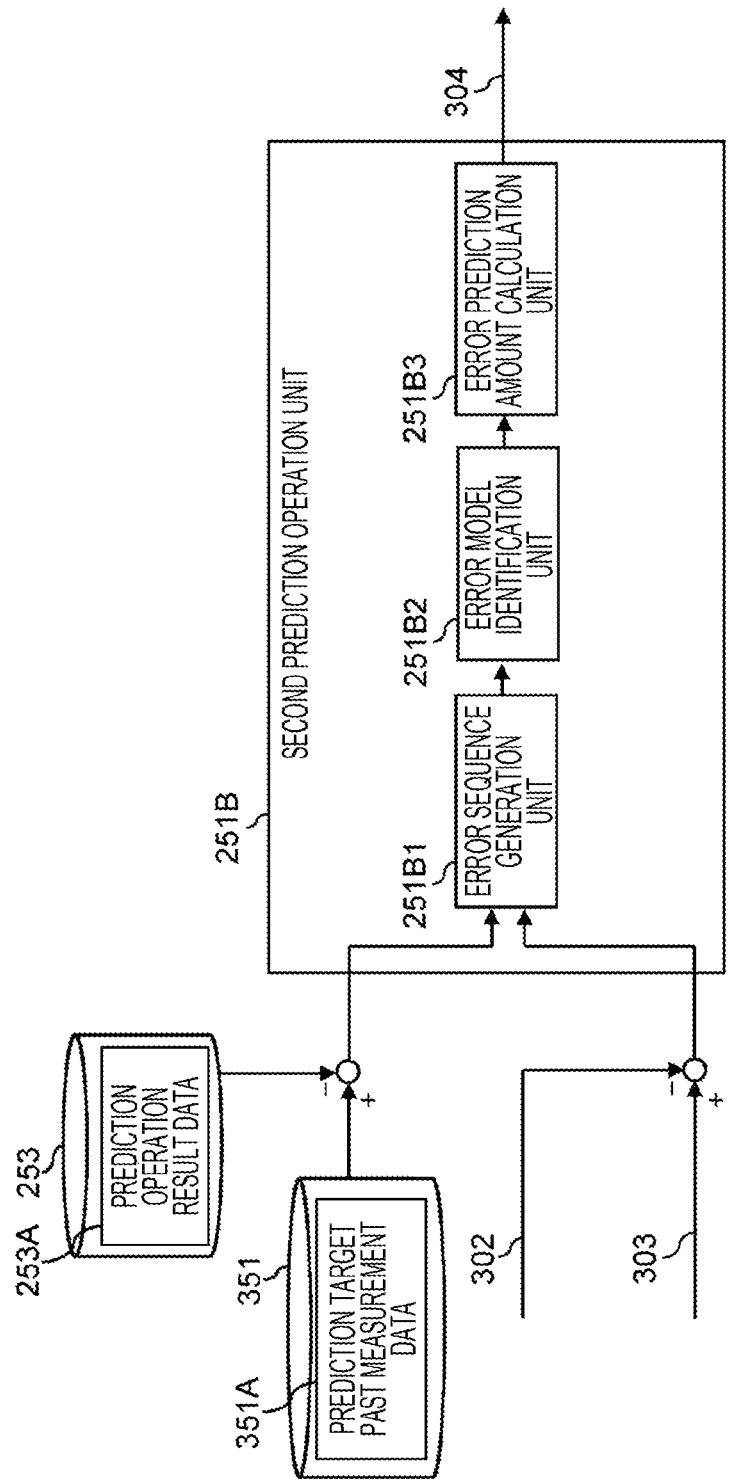
FIG. 7 is a diagram showing a data flow according to a third embodiment of the prediction operation processing.

Referring to FIG. 7, a first embodiment of the second prediction operation unit 251B of the data prediction system 12 in the present embodiment will be described.

The second prediction operation unit 251B in the present embodiment generates a model of error generation tendency, predicts a sequence of an error amount of the first prediction in a prediction target period by he generated model, and outputs it as the second prediction operation result data 304. The error occurrence tendency model is based on the prediction error sequence calculated by the first prediction operation unit 251A up to the present time.

The second prediction operation unit 251B includes a model generation unit (hereinafter, referred to as an error sequence generation unit) 251B1 that generates a sequence of the error occurrence tendency, an error model identification unit 251B2 that predicts a system of an error amount, and an error prediction amount calculation unit 251B3 that calculates an error prediction amount.

Specifically, first, the error sequence generation unit 251B1 calculates time series 310B of a prediction error to be a difference between the first prediction operation result data 302 and the latest observation data 303. In addition, the error sequence generation unit 251B1 calculates time series 310A of a prediction error that is a difference between the prediction operation result data 253A to be the first prediction operation result data 302 in a predetermined past period and the prediction target past measurement data 351A in the same past period. The error sequence generation unit 251B1 connects the sequences of both the prediction errors as an error sequence 310 to be one piece of time-series data.

Next, the error model identification unit 251B2 uses time-series analysis method to perform determination of order and estimation of coefficients in a time-series model such as an AR model or an ARIMA model. For the determination of the order, a known method of calculating Akaike's information criterion (AIC) under several orders and setting an order where a value of the Akaike's information criterion is minimized as an order to be applied may be used. For the determination of the order, a method of applying a lag where a value of an autocorrelation or a partial autocorrelation of time-series data is statistically significant as an order may be used. In the estimation of the coefficients, a known method such as estimation by a least-square method under the applied order may be applied.

The error prediction amount calculation unit 251B3 calculates a prediction value of the error amount of the time series of the first prediction operation result in the prediction target period using the generated model and outputs it as the second prediction operation result data 304.

With the above processing, the second prediction operation processing in the present embodiment ends. When the first prediction operation is performed every predetermined period such as every 24 hours, for example, the sequence of the prediction error may become a discontinuous sequence at the boundary of the period. When the second prediction operation is performed on the basis of the discontinuous sequence, an appropriate second prediction operation result cannot be obtained. Therefore, the second prediction operation may be performed after removing a discontinuity point of the sequence of the prediction error (point to be discontinuous at the break of an engine), for example, by smoothing processing or the like.

Further, the case where the time-series analysis method such as the AR model or the ARIMA model is applied in the error model identification unit 251B2 and the error prediction amount calculation unit 251B3 has been described. However, the present invention is not limited thereto and the time-series analysis method may be replaced by the processing of the first prediction operation unit 251A. In this case, the error model identification unit 251B2 is replaced by the processing of the clustering unit 251A1 and the profiling unit 251A2 shown in FIG. 5 and the error prediction amount calculation unit 251B3 is replaced by the prediction value calculation unit 251A4.

In addition, even when any method is applied by the error model identification unit 251B2, processing in which emphasis is placed on the time series 310B of the prediction error of the past period having the high correlation with the prediction period is performed. Specifically, a weight value in which emphasis is placed on the first prediction operation result data of the past period having high correlation with the prediction period are applied to error model identification processing using the time-series analysis method such as the AR model or the ARIMA model.

Alternatively, when the processing of the clustering unit 251A1 and the profiling unit 251A2 shown in FIG. 5 is applied to the error model identification unit 251B2, the weight value is applied to a decision tree learning algorithm such as CART, ID3, and random forest.

Here, the past period having the high correlation with the prediction period is, for example, a most recent past day of the prediction target day and when there is seasonal periodicity in the variation of the prediction target, the past period is a past day of the same season as the prediction target day. That is, a weight value Wi for data of a past day i is given as a function of a prediction period and a correlation Ci, similarly to the formula (1).

Figure 21:
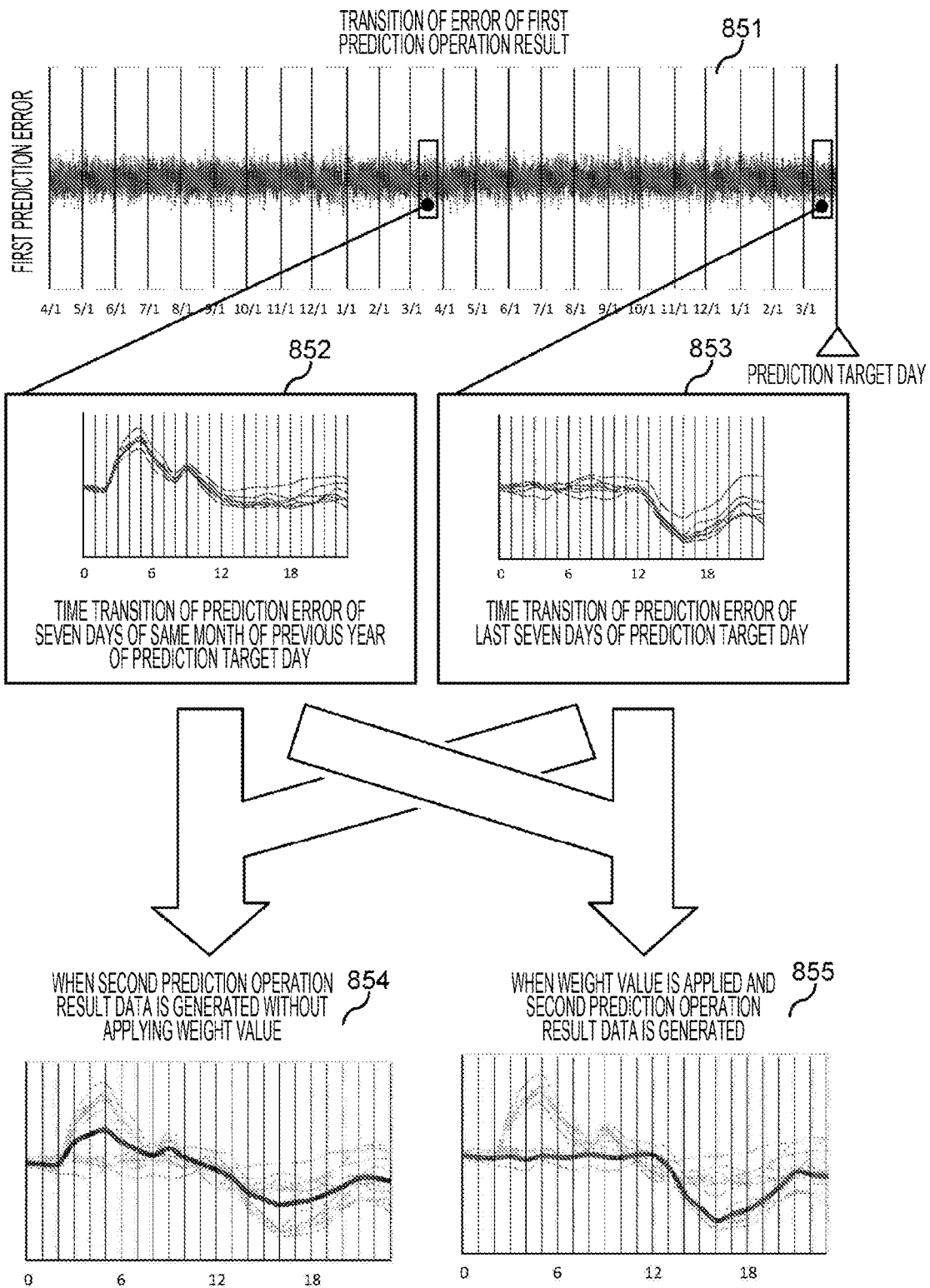
FIG. 21 is a conceptual diagram showing an effect of the data prediction system.

FIG. 21 shows a conceptual diagram of an effect. First, the prediction error in the first prediction operation result is as shown by a graph 851 over the whole year. In a graph 853 of data for the most recent seven days of the prediction target day, an aspect of a first prediction error of each day is aged with respect to a graph 852 of data of seven days of the same month of the previous year of the prediction target day.

Here, if the second prediction operation result data is generated without applying the weight value, it may be generated as a mean error before and after aging as shown by a thick line in a graph 854. When the weight value is applied, data closer to an aspect of a recent error after aging is generated as shown by a thick line in a graph 855. As described above, it is possible to generate the second prediction operation result data 304 reflecting aging of the prediction error more accurately.

(1-5) Description of Effects of Present Invention

Next, effects of the data prediction system 12 in the present embodiment will be described with reference to FIG. 8.

Figure 8:
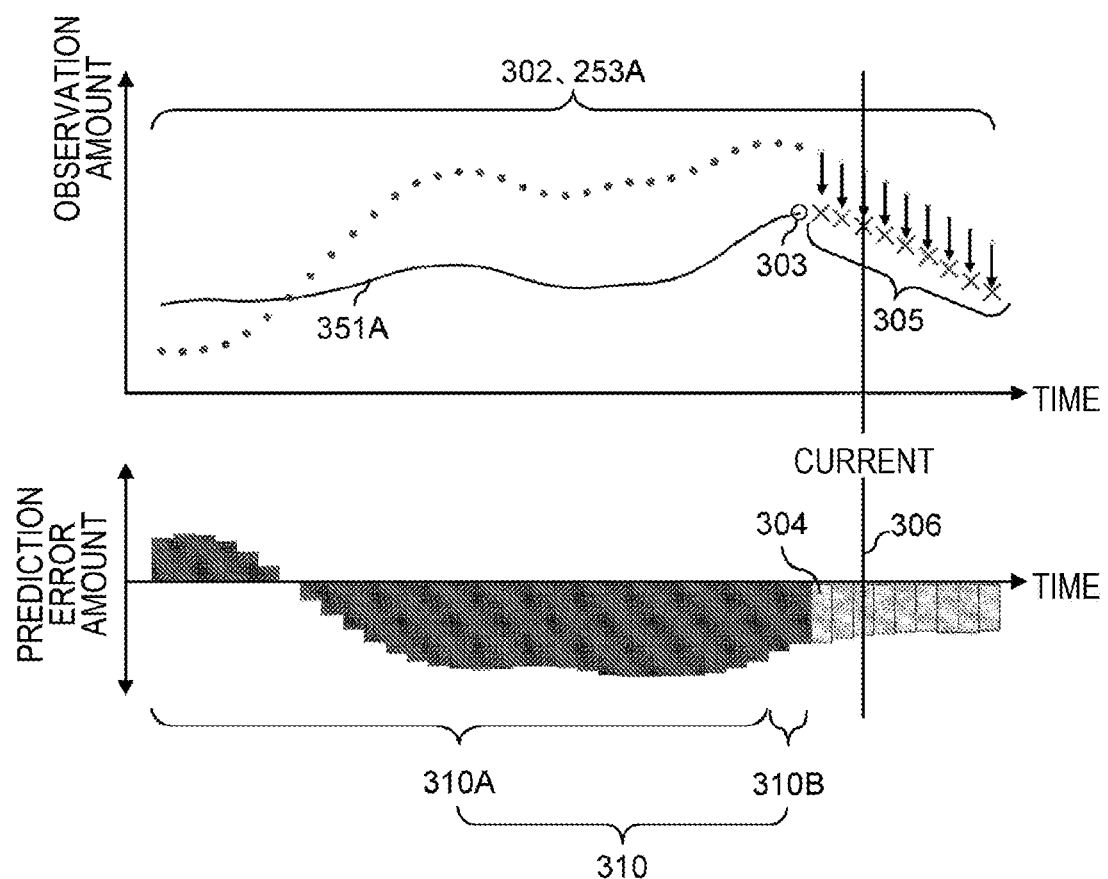
FIG. 8 is a conceptual diagram showing an effect of the data prediction system.

FIG. 8 shows a prediction operation result and an actual observation result (upper stage of FIG. 8) in a certain period and an error amount (lower stage of FIG. 8) of prediction in the same period. In addition, a current time at which the data prediction system 12 in the present embodiment operates is shown as "current 306" in the drawing.

An upper graph of FIG. 8 shows a state in which, for "the first prediction operation result data 302 and the prediction operation result data 253A" calculated by the first prediction operation unit 251A, the "prediction target past measurement data 351A" and the "latest observation data 303" are subsequently obtained.

In FIG. 8, it is assumed that the latest observation data is collected two periods later than "current 306". Therefore, in the second prediction operation unit 251B, an error sequence shown in the "error sequence 310 of the first prediction operation result" of the lower stage of FIG. 8 is calculated as a prediction error confirmed at a time point of "present 306".

Further, in the second prediction operation unit 251B, a model of the occurrence tendency of the error is generated from the error sequence, so that an error amount of the first prediction operation up to the future period preset through the information input/output terminal 4 is calculated as the "second prediction operation result data 304" shown in FIG. 8.

Here, the generation of the error occurrence tendency model performed by the second prediction operation unit 251B may be performed by applying a known method such as the time-series analysis method using the AR model or the ARIMA model as described above and the generation may be performed by applying the method shown in FIGS. 5 and 6 as described above. Finally, the prediction value correction unit 252 adds the "second prediction operation result data 304" to the "first prediction operation result data 302", thereby outputting the "third prediction operation result data 305".

As described above, the variation of the prediction target data which is difficult to explain in the result of the first prediction operation unit 251A that performs prediction using the explanatory variable data 301 is modeled by the second prediction operation unit 251B and is predicted. By correcting the first prediction operation result data 302 of the first prediction operation unit 251A with the second prediction operation result data 304 to be the prediction result, prediction including the variation component which is difficult to explain with the major explanatory variable is realized. The third prediction operation result data 305 is output as the prediction result.

The variation of the prediction target data which is difficult to explain in the result of the first prediction operation unit 251A is, for example, the variation of the data due to the periodicity of the data such as a constant amount observed at night, regardless of the temperature. In addition, the variation of the prediction target data which is difficult to explain in the result of the first prediction operation unit 251A is, for example, the variation of the data due to inertia such as an air conditioning demand maintained constantly even if the temperature changes. In addition, the variation of the prediction target data which is difficult to explain in the result of the first prediction operation unit 251A is, for example, the variation of the data due to unexpected events such as typhoons and events.

As described above, the variation of the prediction target data which is difficult to explain in the result of the first prediction operation unit 251A that performs the prediction using the explanatory variable data 301 is modeled by the second prediction operation unit 251B and is predicted. By correcting the first prediction operation result data 302 of the first prediction operation unit 251A with the second prediction operation result data 304 to be the prediction result, prediction including the variation component which is difficult to explain with the major explanatory variable is realized. The examples of the variation of the prediction target data which is difficult to explain include the variations due to the periodicity of the data such as a constant amount observed at night, regardless of the temperature, the inertia such as an air conditioning demand maintained constantly even if the temperature changes, the unexpected events such as the typhoons and the events, and the like.

(2) Second Embodiment (2-1) Overall Processing and Data Flow of Data Prediction System According to Present Embodiment In the present embodiment, a plurality of prediction operation units other than first and second prediction operation units are provided and a second prediction value correction unit that corrects a prediction value on the basis of results of the plurality of prediction operation units is provided, thereby enabling prediction reflecting a variation of data that cannot be explained yet in the first embodiment.

Figure 9:
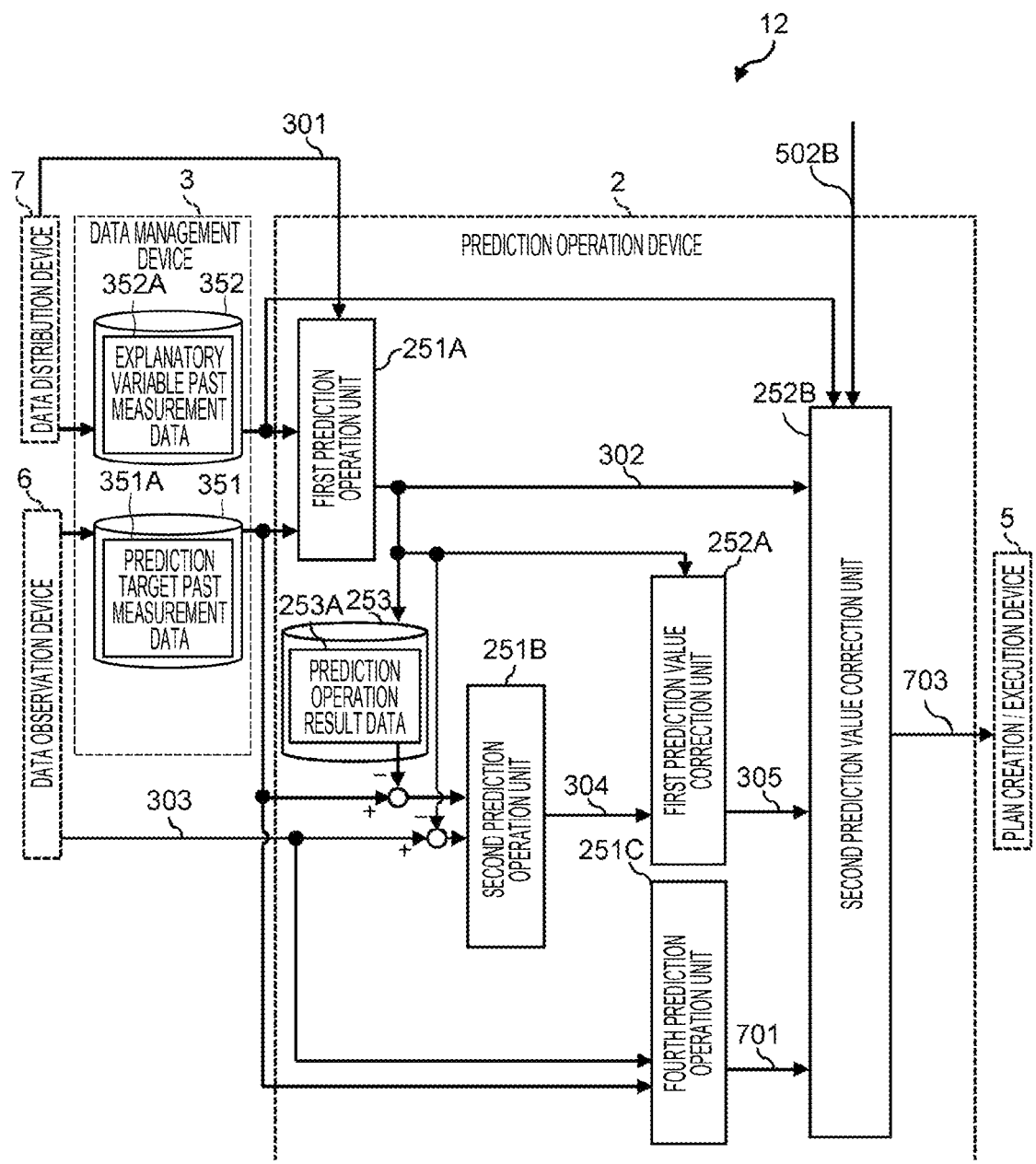
FIG. 9 is a diagram showing a data flow according to a second embodiment of the data prediction system.

The present embodiment will be described with reference to FIGS. 9 and 10. FIG. 9 shows a data flow between functions of a data prediction system 12 in the present embodiment. Here, a second prediction value correction unit 252B and a fourth prediction operation unit 251C to be a difference with the first embodiment shown in FIG. 3 will be described.

First, the fourth prediction operation unit 251C of a prediction operation unit 251 calculates the fourth prediction operation result data 701 including the prediction value in the future period preset through the information input/output terminal 4, on the basis of the prediction target past measurement data 351A and the latest observation data 303.

In addition to the prediction value, the fourth prediction operation result data 701 includes data of a section showing a variation width of the prediction value or data of a model formula for calculating the prediction value and coefficient values thereof. This is the same as first prediction operation result data 302, second prediction operation result data 304, and third prediction operation result data 305.

It should be noted that a prediction target by the fourth prediction operation unit 251C is not the prediction target past measurement data 351A and may be a total value for each time point for each measuring point cluster obtained from a result of a metering point clustering unit 251A11 shown in FIG. 6. In this case, result data of the metering point clustering unit 251A11 shown in FIG. 6 is input to the fourth prediction operation unit 251C.

In addition, the second prediction value correction unit 252B performs correction processing based on the first prediction operation result data 302, the third prediction operation result data 305, and the fourth prediction operation result data 701 and calculates fifth prediction operation result data 703.

Figure 10:
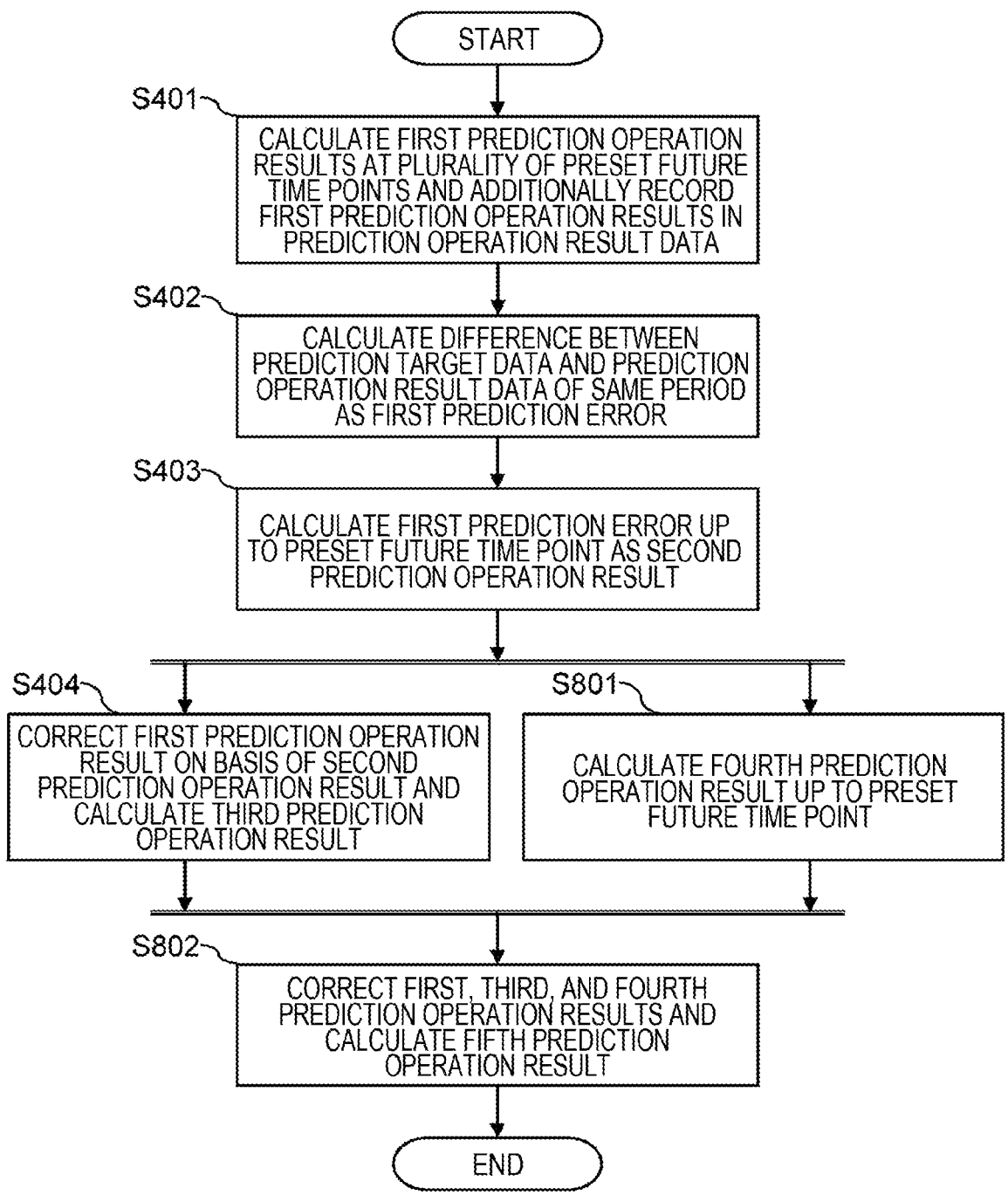
FIG. 10 is a diagram showing a processing flow according to the second embodiment of the data prediction system.

FIG. 10 shows a processing procedure of the data prediction system 12 in the second embodiment. The present processing is processing starting when a prediction operation device 2 receives an input operation from a device user or when a time becomes an execution time preset through the information input/output terminal 4. In the present processing, the prediction operation device 2 executes processing of steps S401 to S404, step S801, and step S802.

Actually, the processing is executed on the basis of various computer programs stored in a CPU 21 and a storage device 25 of the prediction operation device 2 and various computer programs stored in a CPU 31 and a storage device 35 of a data management device 3. For the convenience of explanation, the processing subjects will be described as the prediction operation device 2 and the various computer programs of the prediction operation device 2. Here, steps S801 and S802 to be a difference with the first embodiment shown in FIG. 4 will be described.

First, the fourth prediction operation unit 251C of a prediction operation unit 251 calculates fourth prediction operation result data 701 including a prediction value in a future period preset through an information input/output terminal 4, on the basis of prediction target past measurement data 351A and latest observation data 303 (S801). At the time of the calculation, the fourth prediction operation unit 251C uses a time-series analysis method such as an AR model or an ARIMA model. Here, a method of setting only a lag having a statistically significant correlation as an order in model order identification in the time-series analysis may be used.

Next, the second prediction value correction unit 252B of a prediction value correction unit 252 corrects any prediction operation result data or all prediction operation result data on the basis of the first prediction operation result data 302 calculated by a first prediction operation unit 251A, the third prediction operation result data 305 calculated by the first prediction correction unit 252A, and the fourth prediction operation result data 701 calculated by the fourth prediction operation unit 251C, calculates the fifth prediction operation result data 703 (S802), and transmits it to a plan creation/execution management device 5.

Here, there are several embodiments in the processing of the second prediction value correction unit 252B. Hereinafter, description will be made using FIGS. 11, 12, 13, and 14.

Figure 11:
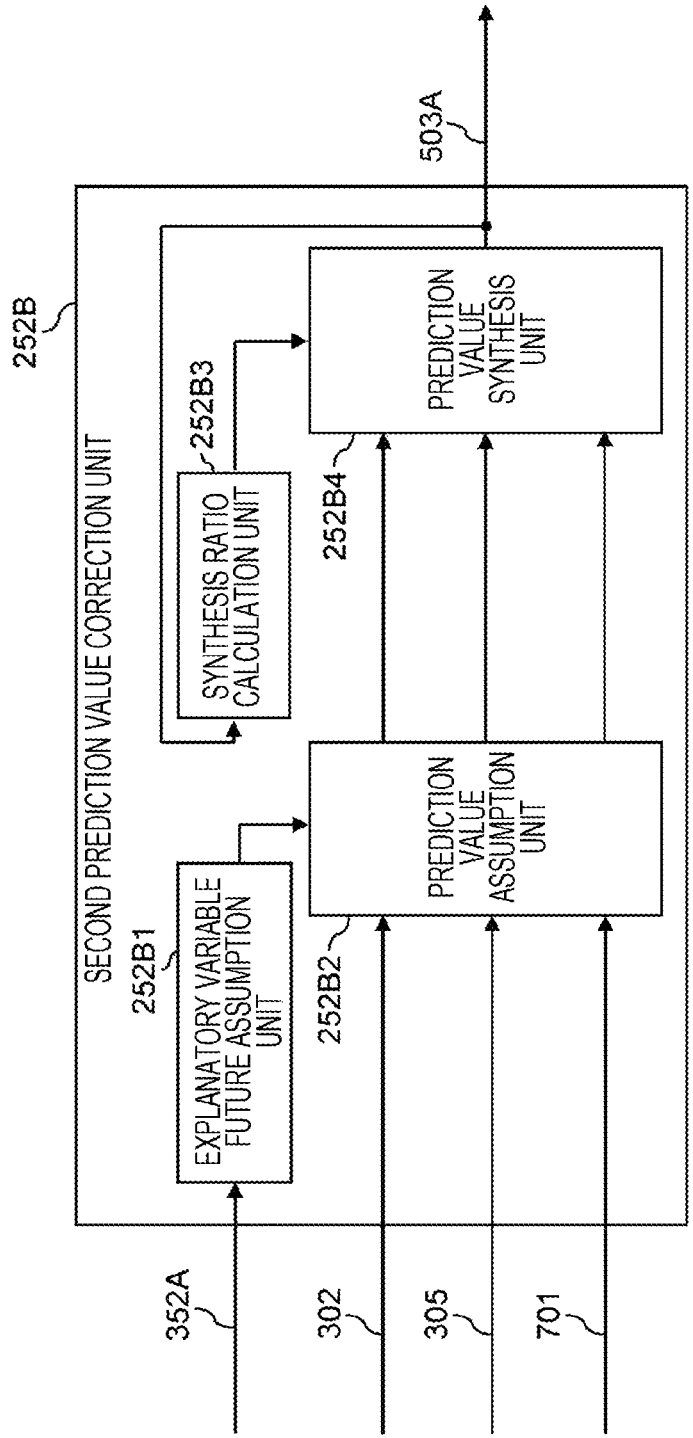
FIG. 11 is a diagram showing a data flow according to a first embodiment of prediction value correction processing.

(2-2) Processing of Second Prediction Value Correction Unit (2-2-1) First Embodiment of Second Prediction Value Correction Unit According to Present Embodiment FIG. 11 shows a data flow between functions in a first embodiment of the second prediction value correction unit 252B. The second prediction value correction unit 252B in the present embodiment calculates a variation amount of a prediction value of a future period of a prediction target preset through the information input/output terminal 4 for a plurality of prediction operation result data.

The second prediction value correction unit 252B causes an index value to be minimized or to fall within a range preset through the information input/output terminal 4. It is assumed that the index value is a variance or a standard deviation of a variation amount of a final prediction value or VaR (Value at Risk) calculated from a reliable section, a prediction section, or a distribution. The second prediction value correction unit 252B calculates final prediction operation result data by synthesizing a plurality of prediction operation result data. A specific processing procedure and a flow of data will be described with reference to FIG. 11.

First, a prediction value assumption unit 252B2 receives model formulas and coefficient values for performing a prediction operation, included in the first, third, and fourth prediction operation result data 302, 305, and 701. In addition, an explanatory variable future assumption unit 252B1 calculates an assumption value of a prediction target period of an explanatory variable such as weather information such as a temperature and a calendar day, on the basis of input explanatory variable past measurement data 352A.

A known method may be applied to a method of calculating the assumption value. As the known method, a method using time-series analysis, a method using a single regression model or a multiple regression model, or a prediction method using a neural network is exemplified. As the known method, a method using a probability model such as modeling as a distribution of measurement tendency of a past value or modeling as a probability process is exemplified. For the assumption value of the prediction target period of the explanatory variable to be calculated, one value may be calculated for each explanatory variable or a plurality of values may be calculated for each explanatory variable.

The prediction value assumption unit 252B2 substitutes the assumption value of the explanatory variable in the prediction target period, calculated by the explanatory variable future assumption unit 252B1, for the model formula and the coefficient value of the input first, third, and fourth prediction operation result data 302, 305, and 701. As a result, the prediction value assumption unit 252B2 calculates the assumption value of the prediction value in the first, third, and fourth prediction operation result data 302, 305, and 701 in the prediction target period.

A prediction value synthesis unit 252B4 proportionally divides and synthesizes the assumption values of the prediction values in the first, third, and fourth prediction operation result data 302, 305, and 701 calculated by the prediction value assumption unit 252B2, on the basis of a predetermined synthesis ratio value, performs weighted mean processing on the assumption values, and calculates a result thereof as candidate result data of fifth prediction operation result data 503A. The candidate result data of the fifth prediction operation result data 503A includes an index value.

A synthesis ratio calculation unit 252B3 determines whether the index value is a minimum value or a preset threshold value or less. When the index value is not the minimum value or the preset threshold value or less, the synthesis ratio calculation unit 252B3 changes a synthesis ratio value of the first, third, and fourth prediction operation results.

A known optimization algorithm such as a genetic algorithm may be applied to processing for changing the synthesis ratio value. Further, as in a Monte Carlo method, processing for extracting a synthesis ratio value in which the index value is the minimum value or the preset threshold value or less from a plurality of randomly set synthesis ratio values may be used.

(2-2-2) Second Embodiment of Second Prediction Value Correction Unit According to Present Embodiment Next, a data flow and a processing flow between functions in a second embodiment of the second prediction value correction unit 252B will be described with reference to FIG. 12. The second prediction value correction unit 252B in the present embodiment calculates a variation amount of a prediction value of a future period of a prediction target preset through the information input/output terminal 4 for a plurality of prediction operation result data.

The second prediction value correction unit 252B calculates a utility value in the prediction target period from the calculated variation amount of the prediction value and input external information. The second prediction value correction unit 252B synthesizes a plurality of prediction operation result data such that a representative value such as a final expectation value of the utility value or an index value is minimized or maximized or falls within a range preset by the information input/output terminal 4. As a result, the second prediction value correction unit 252B calculates final prediction operation result data.

The utility value is a numerical value of the utility for a user of a data management system 1, which increases or decreases as a result of an operation of a physical facility created and executed by the plan creation/execution management device 5 that has received the prediction operation result data. For example, it is a loss amount such as an imbalance cost caused by a difference with an income amount, an expenditure amount, a profit amount, or a predicted or planned power demand value and an actual demand value existing in a power business field and the like.

The specific data and a processing flow will be described with reference to FIG. 12. Only a utility value calculation unit 252B5 and the synthesis ratio calculation unit 252B3 to be a difference with FIG. 11 will be described. The utility value calculation unit 252B5 calculates an assumption value of the utility value in the prediction target period and a variation amount of the assumption value, on the basis of the result candidate data of the fifth prediction operation result data 503B calculated by the prediction value synthesis unit 252B4 and external information data 502B input from the outside. Here, the variation amount of the assumption value includes an index value of the assumption value.

A flow of specific processing of the utility value calculation unit 252B5 in the present embodiment will be described. The utility value calculation unit 252B5 first calculates an assumption value of basic data for calculating the utility value in the prediction target period, on the basis of the input external information data 502B and the explanatory variable past measurement data 352A. The external information data 502B is information necessary for calculating the utility value received from the outside of the data prediction system 12. The external information data 502B is wholesale transaction history data including information of past contract prices and contract amounts at a wholesale power exchange or past history data on imbalance settlement prices calculated by a system operator, for example, in the power field.

Further, the processing for calculating the assumption value of the basic data for calculating the utility value in the prediction target period on the basis of the external information data 502B may be performed by using the method described when the first prediction operation unit 251A performs prediction.

Next, the synthesis ratio calculation unit 252B3 determines whether a representative value such as an expectation value or a total value of the assumption value of the utility value in the prediction target period, which is calculated by the utility value calculation unit 252B5, or an index value is minimum or maximum or falls within a range preset through the information input/output terminal 4. If a determination result from the synthesis ratio calculation unit 252B3 is neither minimum nor maximum or does not fall within the range preset through the information input/output terminal 4, the synthesis ratio calculation unit 252B3 changes a synthesis ratio value of the first, third, and fourth prediction operation results. The processing for changing the synthesis ratio value is the same as the embodiment shown in FIG. 11.

With the above processing, the utility value calculation unit 252B5 in the present embodiment corrects the first, third, and fourth prediction operation results 302, 305, and 701 on the basis of the utility value predicted or assumed in the prediction target period and calculates the fifth prediction operation result data 503B.

In the case of positive utility such as the income amount and the profit amount, the processing may be performed such that a representative value such as a final expectation value of the utility value is maximized and in the case of negative utility such as the expenditure amount and the loss amount, the processing may be performed such that the representative value such as the final expectation value of the utility value is minimized.

Here, although the utility value is described as a value belonging to a financial concept, the present invention is not limited thereto. For example, the utility value may be a value belonging to a sensory concept such as comfort, for example. In addition, the utility value calculated by the utility value calculation unit 252B5 has been described as being calculated as a future value that may occur in the prediction target period. However, the present invention is not limited thereto and the utility value may be calculated as a utility value in a preset past period.

In this case, the synthesis ratio calculation unit 252B3 determines whether a representative value such as a mean value or a total value of the past utility values calculated in the predetermined past period or an index value is minimum or maximum or falls within the range preset through the information input/output terminal 4. When a determination result is neither minimum nor maximum or does not fall within the range preset through the information input/output terminal 4, the synthesis ratio calculation unit 252B3 changes a synthesis ratio value of the first, third, and fourth prediction operation result data 302, 305, and 701.

Figure 13:
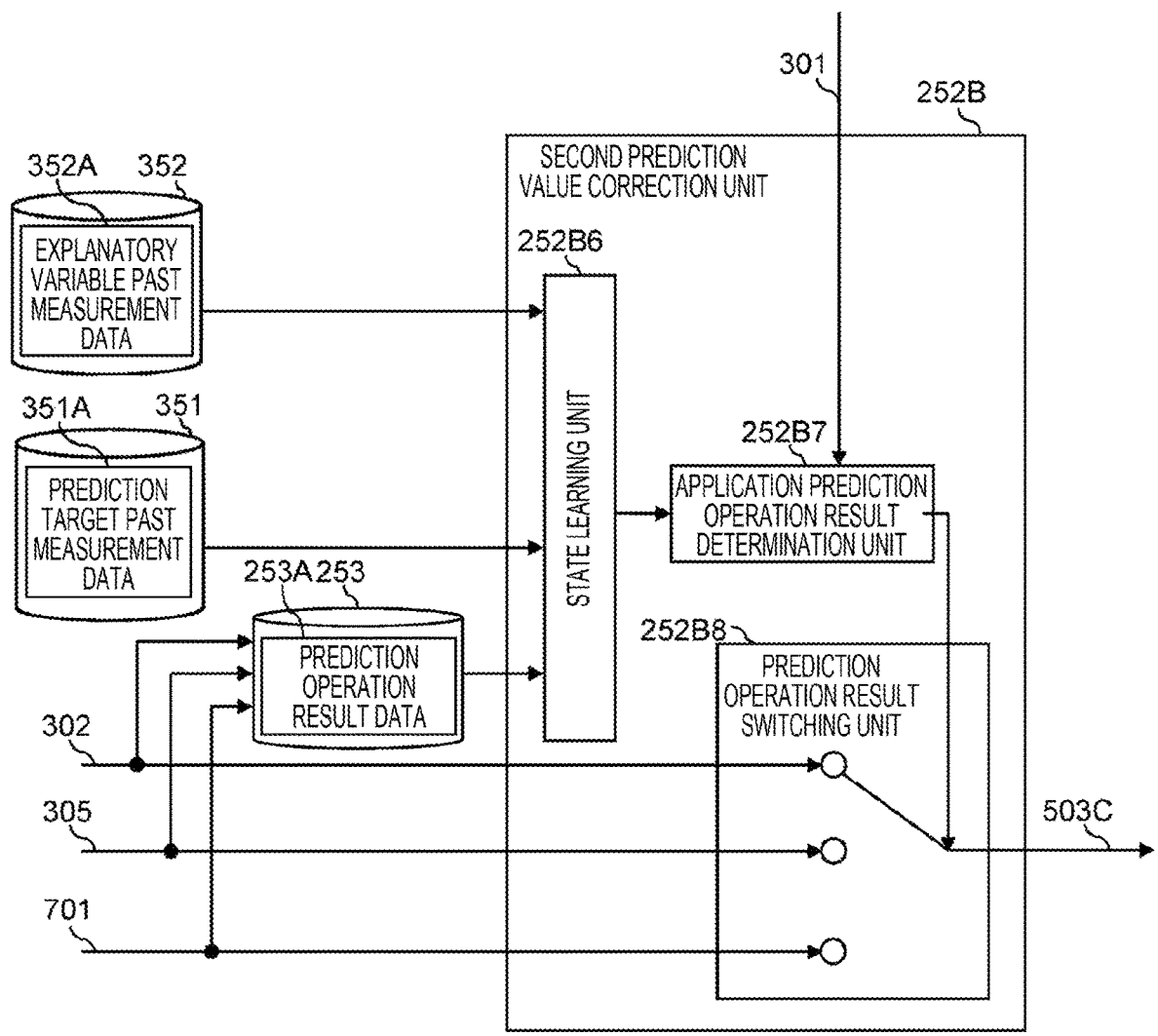
FIG. 13 is a diagram showing a data flow according to a third embodiment of the prediction value correction processing.

(2-2-3) Third Embodiment of Second Prediction Value Correction Unit According to Present Embodiment Next, a data flow and a processing flow between functions in a third embodiment of the second prediction value correction unit 252B will be described with reference to FIG. 13. The second prediction value correction unit 252B in the present embodiment determines the prediction operation result data applied in the prediction target period, on the basis of the prediction operation result data 253A storing the first, third, and fourth past prediction operation result data 302, 305, and 701, thereby calculating fifth prediction operation result data 503C.

Specifically, first, a state learning unit 252B6 calculates state information to be relation information between the respective prediction operation results and attribute information of the prediction target period, from the input prediction operation result data 253A and explanatory variable past measurement data 352A. The attribute information of the prediction target period is shown as a date type showing a month, a day of the week, a time zone, a weekday, or a holiday of a certain prediction target period where the prediction operation has been performed in the past, weather information of such as the temperature and the humidity, and information including these information of the prediction target period, for example.

For example, a state of the prediction target period is set to "month=1", "day of the week=month", "day type=weekday", "mean temperature=7", and "mean temperature difference with previous prediction target period=– 3". In this case, the state information to be the relation information between the state of the prediction target period and the first prediction operation result becomes a "mean error rate 4.32%". Further, the state information to be the relation information between the state of the prediction target period and the second prediction operation result becomes a "mean error rate 1.22%". Further, the state information to be the relation information between the state of the prediction target period and the third prediction operation result becomes a "mean error rate 6.01%".

Although associating the mean error rate in each prediction operation has been described as an example of the state information, the present invention is not limited thereto. For example, label information such as "appropriate" and "inappropriate" may be associated. Further, information representing an error sequence of each prediction operation result, for example, an arrangement of the error sequence, result information obtained by performing frequency analysis such as the Fourier transform on the error sequence, or the like may be associated.

The processing for calculating the relation information between each prediction operation result and the state of the prediction target period may be preset through the information input/output terminal 4, for example. A known learning algorithm may be applied to the calculation processing. Examples of the known algorithm include a decision tree learning algorithms such as CART, ID3, and random forest, discriminator learning algorithms such as a support vector machine (SVM) and naive Bayes, and the like. The known algorithm uses the information showing the error sequence of each prediction operation result, for example, the arrangement of the error sequence, the result information obtained by performing the frequency analysis such as the Fourier transform on the error sequence, and the like as teacher labels.

Next, an application prediction operation result determination unit 252B7 determines the prediction operation result to be applied to the prediction target period, on the basis of the state information calculated by the state learning unit 252B6 and the prediction value of explanatory variable data relating to the prediction target period. In addition, a prediction operation result switching unit 252B8 selects any one of the first, third, and fourth prediction operation result data 302, 305, and 701 on the basis of the information of the applied prediction operation result calculated by the applicable prediction operation result determination unit 252B7 and calculates it as the fifth prediction operation result data 503C.

With the above processing, the utility value calculation unit 252B5 in the present embodiment calculates the prediction operation result data to be applied in the prediction target period, on the basis of the prediction operation result data 253A storing the first, third, and fourth past prediction operation result data. The utility value calculation unit 252B5 calculates the fifth prediction operation result data 503C on the basis of the determination result.

In the third embodiment of the second prediction value correction unit 252B, the case where the prediction operation result to be applied in the prediction target period is determined on the basis of the relation information between the prediction operation result and the state of the prediction target period has been described. However, the present invention is not limited thereto. For example, the prediction operation result applied in the prediction target period may be determined on the basis of the data calculated by the prediction value assumption unit 252B2 shown in FIGS. 11 and 12.

In this case, the prediction operation result switching unit 252B8 performs processing for switching the calculation value into the prediction operation result data in which the representative value such as the expectation value of the prediction value in the first, third, or fourth prediction target period, calculated by the prediction value assumption unit 252B2, or the index value is minimum.

Figure 12:
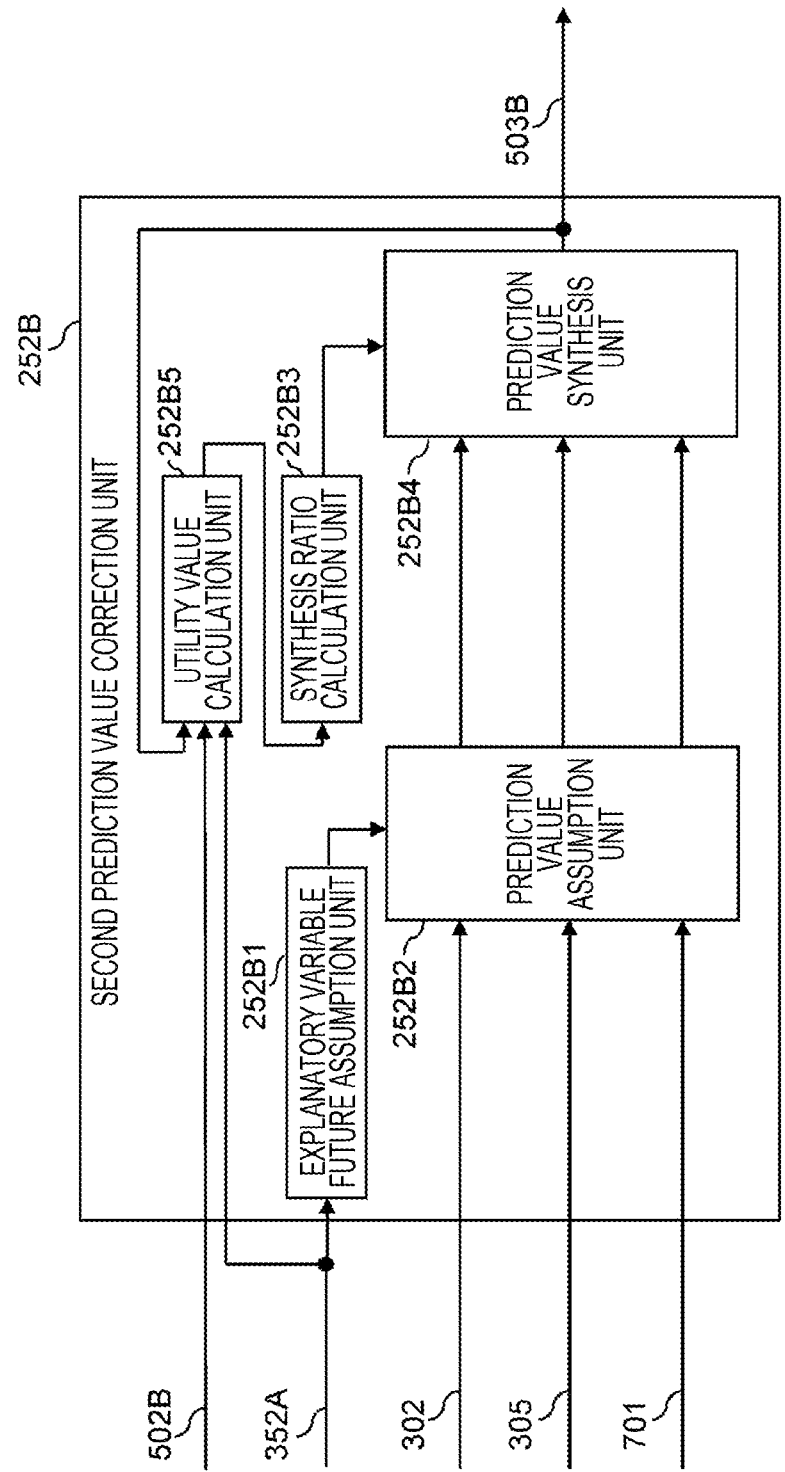
FIG. 12 is a diagram showing a data flow according to a second embodiment of the prediction value correction processing.

The present invention is not limited thereto and the prediction operation result switching unit 252B8 may determine the prediction operation result to be applied in the prediction target period, on the basis of the information of the prediction operation result of the utility value in each prediction operation result data in the prediction target period, calculated by the utility value calculation unit 252B5 shown in FIG. 12. In addition, the prediction operation result switching unit 252B8 may determine the prediction operation result to be applied to the prediction target period, on the basis of the information of the result of the utility value in each prediction operation result data in the past period, calculated by the utility value calculation unit 252B5.

In this case, the prediction operation result switching unit 252B8 performs the processing for switching the prediction operation result data, on the basis of the representative value such as the expectation value or the total value of the utility value in each prediction operation result data in the prediction target period, calculated by the utility value calculation unit 252B5, or the index value of the utility value. Alternatively, the prediction operation result switching unit 252B8 performs the processing for switching the prediction operation result data, on the basis of the representative value such as the mean value or the total value of the utility value in each prediction operation result data in the predetermined past period or the index value of the utility value. The prediction operation result data is set to a maximum value in the case of positive utility and is set to a minimum value in the case of negative utility.

In addition, the prediction operation result switching unit 252B8 may compare a plurality of prediction operation results (advance prediction operation results) calculated and output at a certain past time point and respective prediction operation results (latest prediction operation results) operated and output again at a time point after the past time point. By the comparison, the prediction operation result applied to the prediction target period may be determined. Specifically, errors to be differences between the advance prediction operation results and the latest prediction operation results of the plurality of prediction operation results are calculated and the prediction operation result with the smallest error is used as the prediction operation result to be applied to the prediction target period.

(2-2-4) Fourth Embodiment of Second Prediction Value Correction Unit According to Present Embodiment Next, processing in a fourth embodiment of the second prediction value correction unit 252B will be described with reference to FIGS. 14 and 15.

Figure 14:
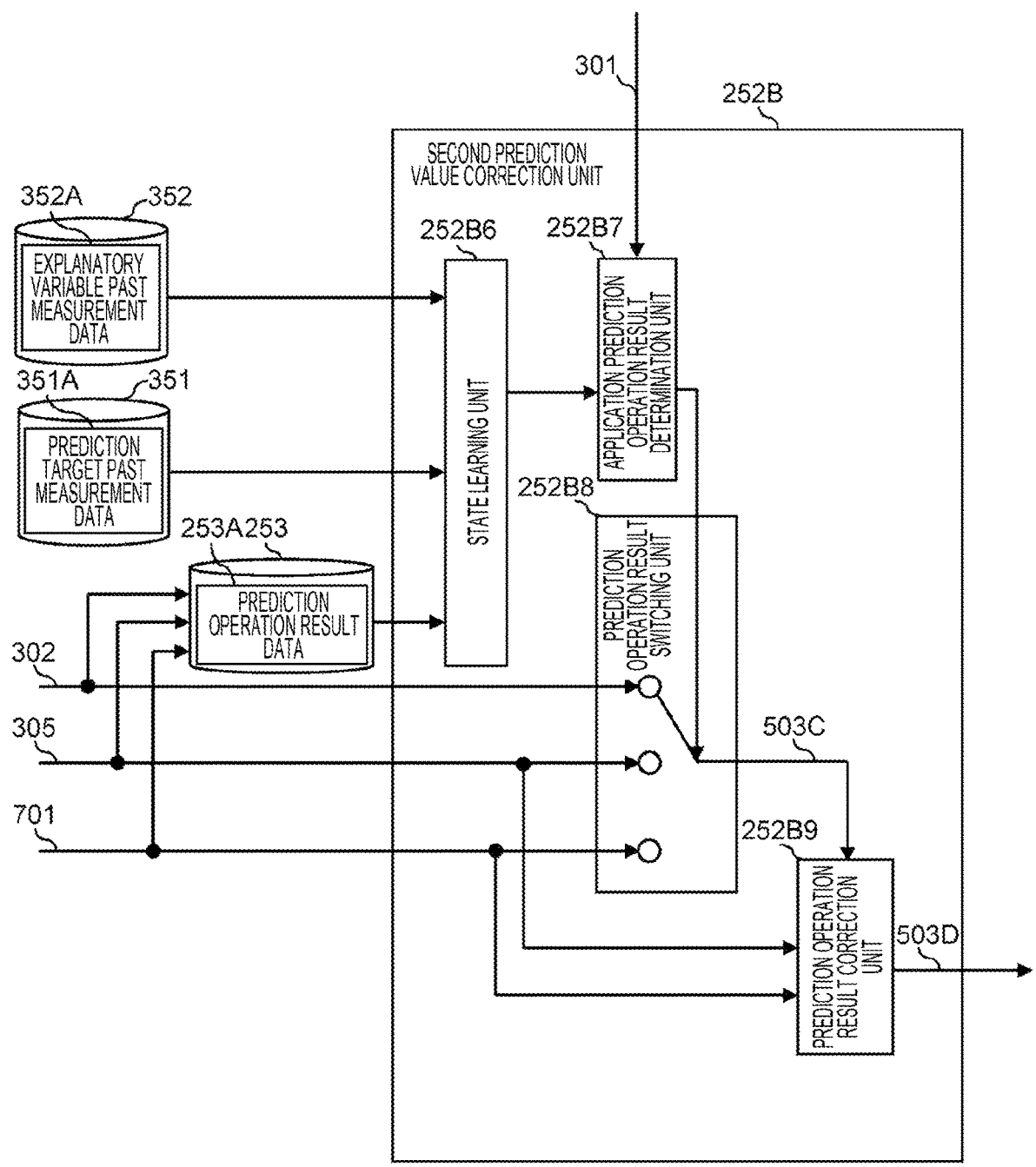
FIG. 14 is a diagram showing a data flow according to a fourth embodiment of the prediction value correction processing.

FIG. 14 shows a data flow showing an embodiment in which a prediction operation result correction unit 252B9 to be described later is added to the third embodiment of the second prediction value correction unit 252B shown in FIG. 13. FIG. 15 graphically shows data to be input to the second prediction value correction unit 252B in the present embodiment and data output as a result of processing of the second prediction value correction unit 252B in the present embodiment. Here, for the sake of simplicity, processing when the first and fourth prediction operation result data 302 and 701 are input will be described.

The first prediction operation result data 302 and the fourth prediction operation result data 701 are input to the prediction operation result correction section 252B9 as shown in an upper stage of FIG. 15. The prediction operation result correction unit 252B9 corrects other prediction operation result data with preset prediction operation result data as a reference.

For example, when the reference prediction operation result data is set as the fourth prediction operation result data 701, the first prediction operation result data 302 is corrected such that a residual for each of the same times as the fourth prediction operation result data 701 is minimized.

Specific correction processing may be, for example, processing for performing correction such that the least square residual sum for each same time is minimized. The first prediction operation result data 302 after the correction processing is shown in a lower stage of FIG. 14 and the prediction operation result data after the correction is output as the fifth prediction operation result data 503D. Here, the prediction operation result data used as the reference in the correction processing may be set through the information input/output terminal 4 or may be prediction operation result data based on the prediction operation result data to be applied, calculated by the application prediction operation result determination unit 252B7 shown in FIG. 13.

The case where two pieces of data including the first and fourth prediction operation result data 302 and 701 are input has been described. However, even when the third prediction operation result data 305 is input, the correction processing based on the reference prediction operation result data is performed, similar to the above. In addition, the fifth prediction operation result data 503D output by the second prediction value correction unit 252B in the present embodiment may be an arithmetic mean value for each time in the corrected first prediction operation result data 302, the corrected third prediction operation result data 305, or the corrected fourth prediction operation result data 701 used as the reference. Further, the fifth prediction operation result data 503D output by the second prediction value correction unit 252B may be the corrected first prediction operation result data 302, the corrected third prediction operation result data 305, or the corrected fourth prediction operation result data 701 used as the reference.

Alternatively, the corrected first prediction operation result data, the corrected third prediction operation result data, or the corrected fourth prediction operation result data used as the reference may be proportionally divided and synthesized on the basis of the synthesis ratio calculated by the synthesis ratio calculation unit 252B3 shown in FIGS. 11 and 12 and may be output as the fifth prediction operation result data 503D. Here, although the case where the correction based on the fourth prediction operation result data 701 is performed has been described, the present invention is not limited thereto and correction processing based on actually measured prediction target data may be performed.

(2-3) Modification of Present Embodiment

In the description of the second embodiment of the data prediction system 12, the prediction operation unit 251 has been described as including the three first, second, and fourth prediction operation units 251A, 251B, and 251C. However, the present invention is not limited thereto and the prediction operation unit 251 may include four or more prediction operation units. In this case, the prediction operation result data input to the second prediction value correction unit 252B is set as four or more pieces of data and the processing of the second prediction value correction unit 252B is performed.

Figure 3:
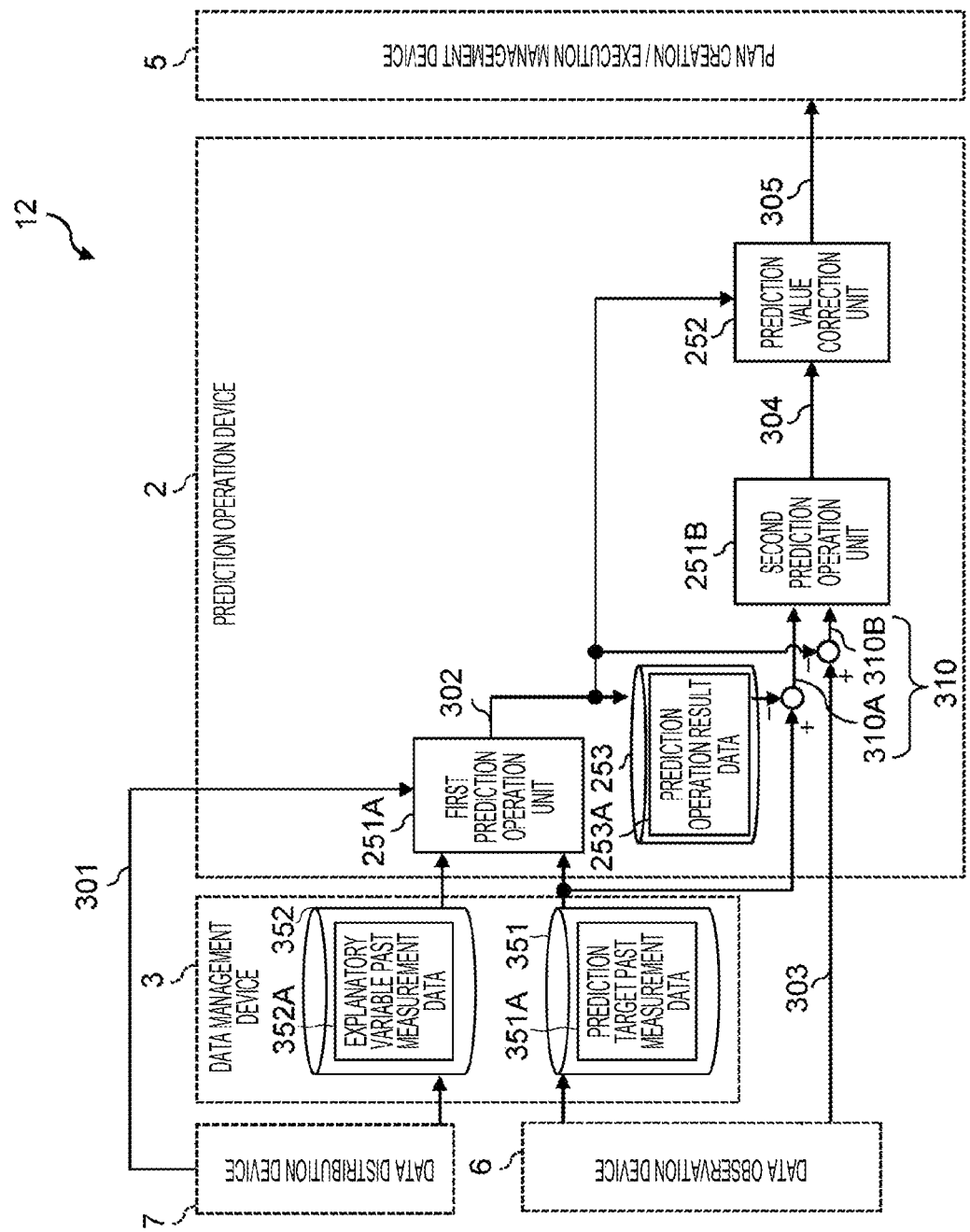
FIG. 3 is a diagram showing a data flow according to the first embodiment of the data prediction system.
Figure 4:
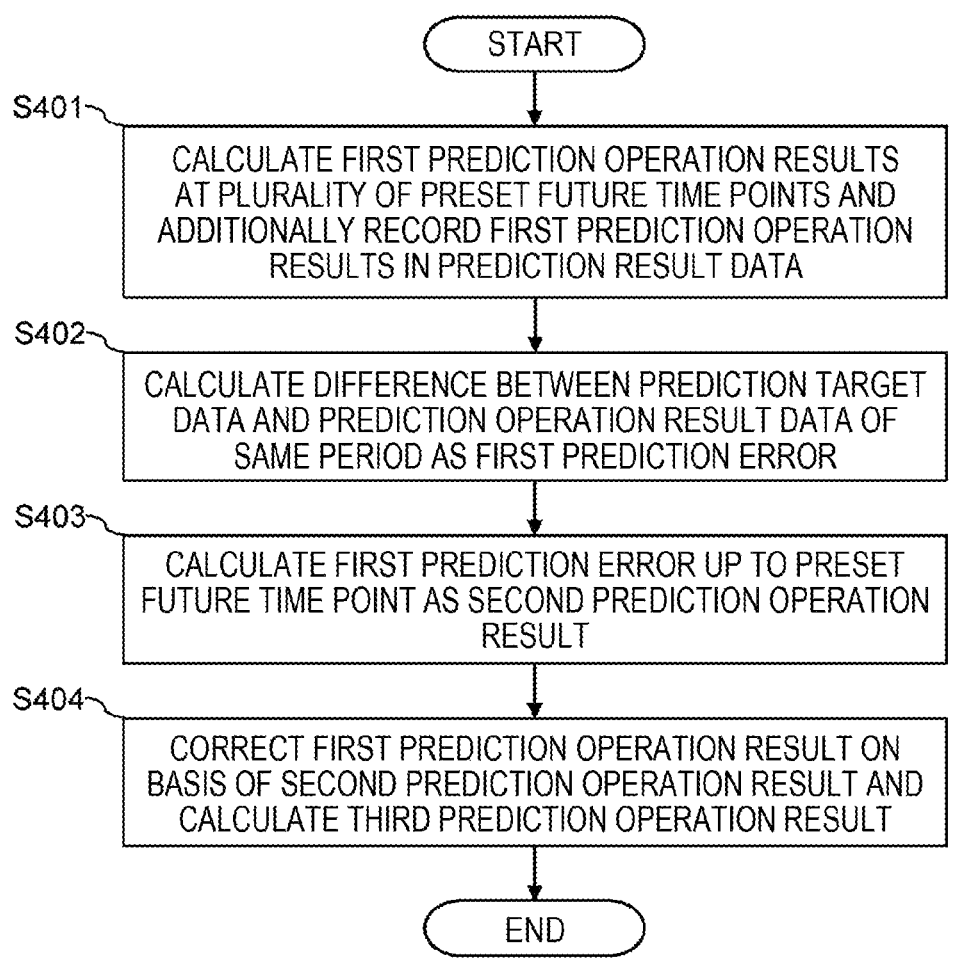
FIG. 4 is a diagram showing a processing flow according to the first embodiment of the data prediction system.

Particularly, a configuration in which a prediction operation unit replacing the first prediction operation unit 251A shown in FIGS. 3 and 9 is added may be adopted. In this case, the prediction error sequence to be input to the second prediction operation unit 251B performs processing for selecting any one of the prediction operation result data calculated from the first prediction operation unit 251A and the added prediction operation unit. This modification will be described with reference to FIG. 16.

Figure 16:
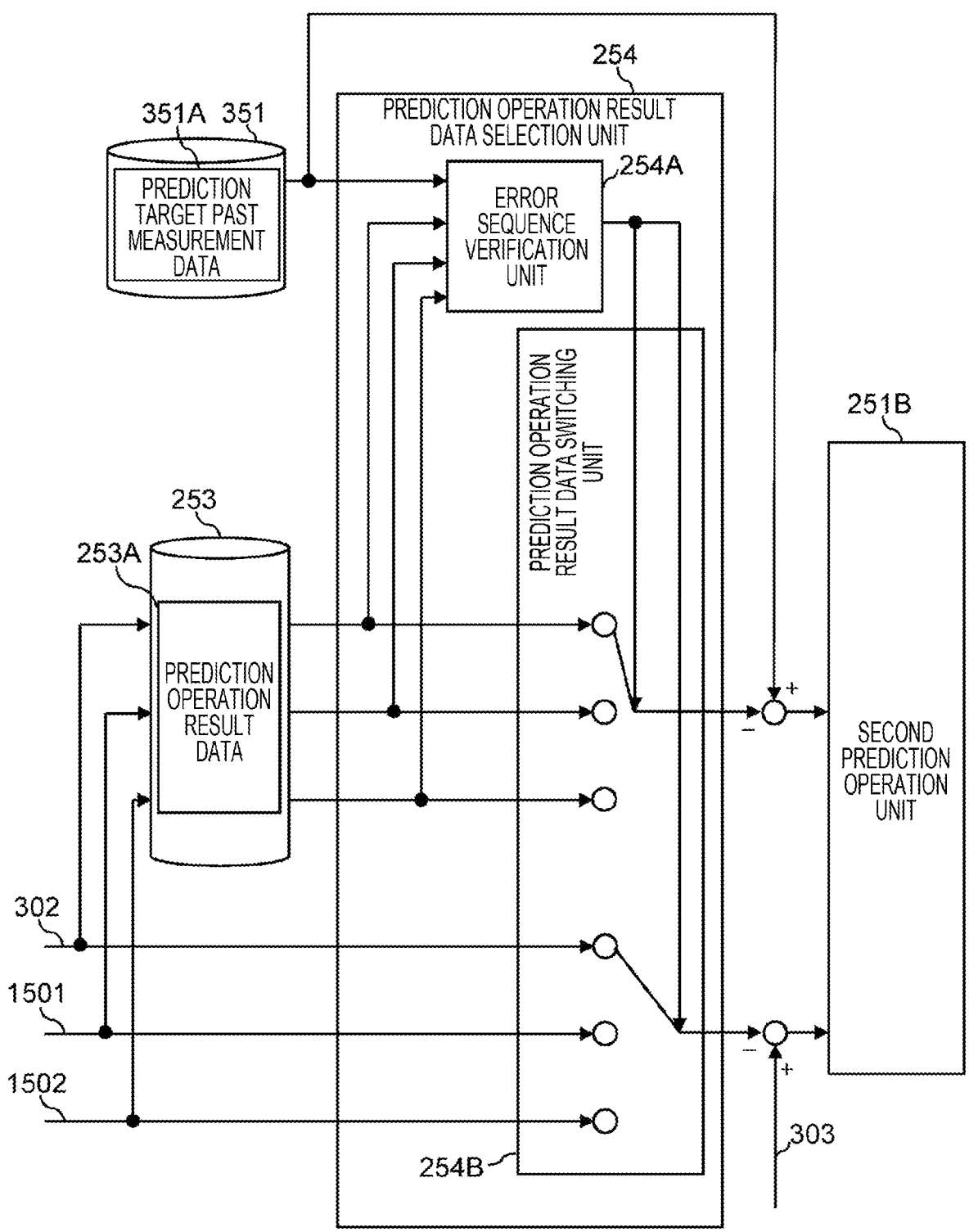
FIG. 16 is a diagram showing a data flow according to a modification of the second embodiment of the data prediction system.

FIG. 16 shows a data flow of a prediction operation result data selection unit 254 in the present modification. From the three prediction operation result data, the prediction operation result data or the prediction error sequence input to the second prediction operation unit 251B is determined. The three prediction operation result data are the first prediction operation result data 302, sixth prediction operation result data 1501, and seventh prediction operation result data 1502.

As shown in FIGS. 3 and 9, the first prediction operation unit 251A calculates the first prediction operation result data 302. Likewise, the sixth prediction operation unit calculates the sixth prediction operation result data 1501 and the seventh prediction operation unit calculates the seventh prediction operation result data 1502.

First, a stationarity verification unit (hereinafter, referred to as an error sequence verification unit) 254A generates a prediction error sequence from the prediction target past measurement data 351A and the first, sixth, and seventh prediction operation result data 302, 1501, and 1502. Next, the error sequence verification unit 254A verifies whether or not the prediction error sequence of each prediction operation result is a stationary sequence or calculates a numerical value showing a degree of stationarity of the prediction error sequence of each prediction operation result. In the verification of whether or not the prediction error sequence is the stationary sequence, for example, a known verification method such as an Augmented Dickey Fuller (ADF) verification is used. As the numerical value showing the degree of stationarity, for example, a numerical value representing stationarity or non-stationarity such as a t value or a determination coefficient calculated as a result of verification processing may be used.

In addition, a data selection unit (hereinafter, referred to as a prediction operation result data switching unit) 254B selects and outputs the prediction operation result data to be input to the second prediction operation unit 251B, on the basis of the numerical value showing the determination result or the degree of stationarity calculated by the error sequence verification unit 254A. The prediction operation result data is selected from the first, sixth, or seventh prediction operation result data and the prediction operation result data 253A to be the first, sixth, or seventh past prediction operation result data.

With the above processing, the operation of the prediction operation result data selection unit 254 is completed. The prediction error sequence of the prediction operation result data selected and output by the prediction operation result data selection unit 254 is a sequence close to the stationary sequence or the most stationary sequence among prediction errors of each prediction operation result data. Therefore, it is possible to obtain an effect in which prediction accuracy of the second prediction operation result data calculated by the second prediction operation unit 251B is improved and prediction accuracy of the corrected third prediction operation result data is improved.

It should be noted that the method disclosed with reference to FIGS. 5 and 6 in the description of the first prediction operation unit 251A or a known method may be applied to the prediction operation processing of the sixth and seventh prediction operation units having calculated the sixth and seventh prediction operation result data. Examples of the known method include a prediction method using a single regression model or a multiple regression model, a prediction method using a neural network, a prediction method using time-series analysis such as an AR model or an ARIMA model, and the like. The examples of the known method include a prediction method based on an arithmetic mean value of a similar past period preset through the information input/output terminal 4 on the basis of the day of the week or the temperature.

Figure 17:
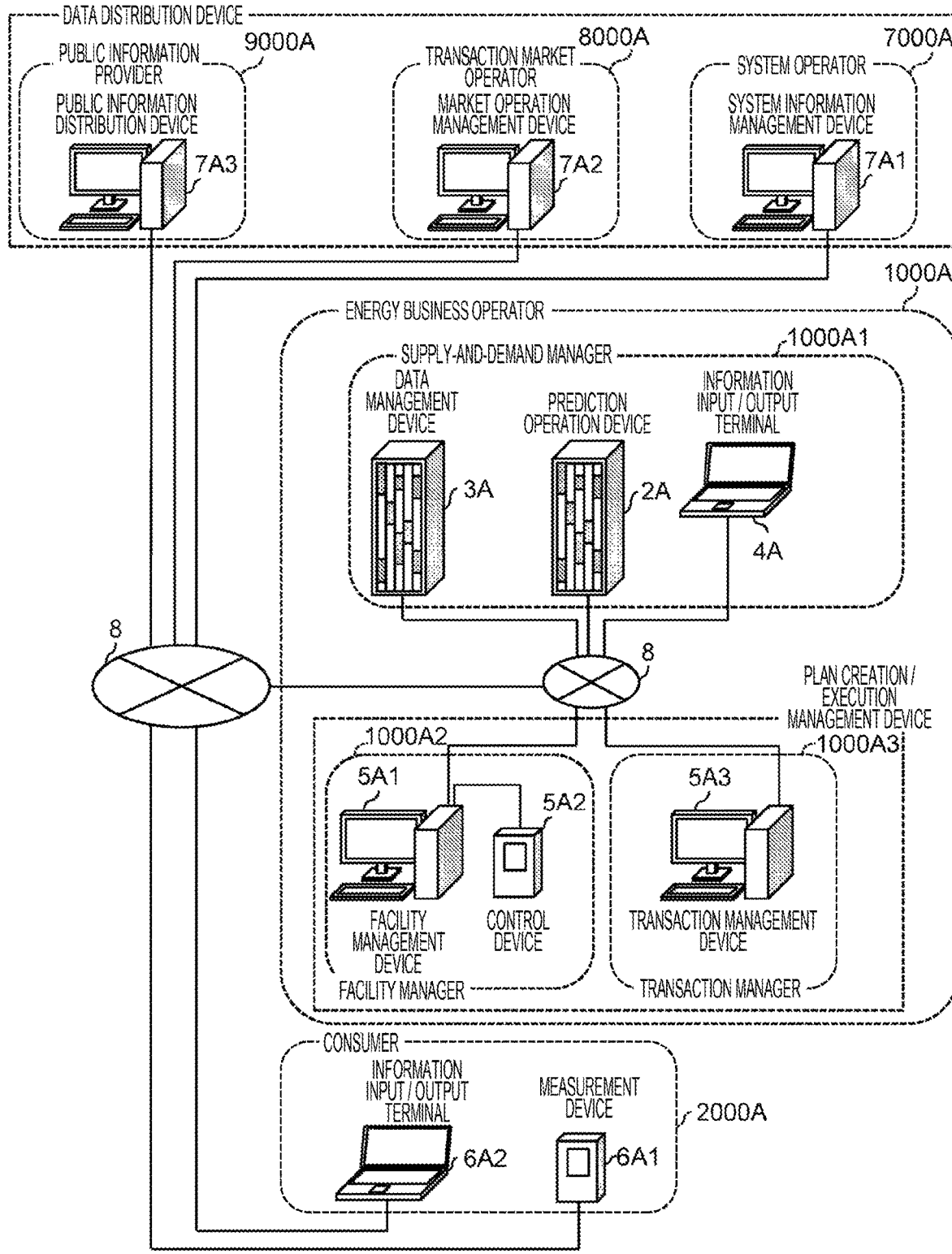
FIG. 17 is a diagram showing a device configuration according to a modification of the data management system.

(3) Modification of System Configuration (3-1) Example of Application to Energy Business Field Such as Power, Gas, and Water Next, an embodiment of the case where the data management system 1 is applied to an energy business field such as power, gas, and water will be described with reference to FIG. 17.

A data management system 1A calculates a time-series prediction value of the energy demand amount in a predetermined future period. The data management system 1A is a system for performing generation or control execution of an operation plan of an energy supply device such as a generator and a gas or water delivery pump, which can be operated on the basis of the calculated energy demand amount. Further, the data management system 1A is a system for generating and executing a plan of energy procurement transactions from other energy business operator or an exchange.

The data management system is configured to include an energy business operator 1000A, a system operator 7000A, a transaction market operator 8000A, a public information provider 9000A, a consumer 2000A, and various devices and terminals of these components. The energy business operator 1000A is a business operator including a supply-and-demand manager 1000A1, a facility manager 1000A2, and a transaction manager 1000A3.

The supply-and-demand manager 1000A1 is a department or a person in charge of managing an energy procurement amount. The department or the person in charge of managing the energy procurement amount predicts a future energy a demand amount, on the basis of time-series data of a past energy demand amount for each customer, all customers, or a predetermined group of customers and factor data capable of explaining a variation of the energy demand amount. The factor data is, for example, a weather and a prediction unit of the future energy demand amount is, for example, a unit of 30 minutes. The department or the person in charge of managing the energy procurement amount manages the energy procurement to satisfy the predicted energy demand amount.

The supply-and-demand manager 1000A1 includes a data management device 3A that stores the time-series data of the measured past energy demand amount and the factor data such as the weather capable of explaining the variation of the energy demand amount. The supply-and-demand manager 1000A1 further includes a prediction operation device 2A to calculate a prediction value of the energy demand and an information input/output terminal 4A to exchange data with these devices.

The facility manager 1000A2 is a department or a person in charge of drafting and executing an operation plan of the energy supply facility owned by a company or an energy supply facility that can be incorporated in a company's energy procurement plan and not owned by the company.

The facility manager 1000A2 includes a facility management device 5A1 to transmit a control signal for managing information of the energy supply facility and drafting and executing the operation plan of the energy supply facility. The facility manager 1000A2 further includes a control device 5A2 to receive the control signal from the facility management device 5A1 and actually control the energy supply facility.

The transaction manager 1000A3 is a department or a person in charge of planning and executing transactions for procuring energy through a direct contract with other energy business operator or via an exchange. The transaction manager 1000A3 includes a transaction management device 5A3 to manage information of an energy procurement transaction plan or a completed energy procurement contract and to exchange telegrams concerning transactions with other energy business operator or the exchange.

The system operator 7000A is a business operator who manages energy supply system facilities covering a wide area and measures an actual energy demand amount of each consumer of the area and stores a measurement value. The system operator 7000A includes a system information management device 7A1 to distribute data of the measured energy demand amount of each customer.

The transaction market operator 8000A is a business operator who generally manages information and procedures necessary for conducting energy transactions, with respect to a plurality of energy business operators. The transaction market operator 8000A includes a market operation management device 7A2 to distribute information on energy transactions and perform collation processing of an order accepted from each energy business operator.

The public information provider 9000A is a business operator who provides past history information on a weather such as a temperature, a humidity, an atmospheric pressure, a wind speed, a precipitation amount, and a snowfall amount and future prediction information and includes a public information distribution device 7A3 to distribute the past history information of the weather and the prediction information.

The consumer 2000A is an individual or a corporation having energy consumption facilities or supply facilities. The customer 2000A includes an information input/output terminal 6A2 to transmit information affecting the demand and supply tendency of energy such as facilities owned by the consumer, industries, occupants, and locations, to the energy business operator 1000A or the system operator 7000A. The consumer 2000A further includes a measurement device 6A1 to measure a demand amount or a supply amount of energy at predetermined time intervals and transmit a measurement amount to the data management device 3A, the prediction operation device 2A, or the system information management device 7A1.

The above is an example of the device configuration in the embodiment of the case where the data management system 1 is applied to an energy business field such as power, gas, or water. It should be noted that the processing of each device in the present embodiment and the processing unit of each device are the same as those in the embodiment already disclosed.

However, the prediction target past measurement data 351A is measurement data of an energy consumption amount in time series. The time series is time series for each consumer or energy meter or time series as a total value for each time of all customers or all energy meters. Further, it is assumed that the time series is time series as a total value for each time of a consumer group unit or an energy meter group unit preset by the energy business operator. It should be noted that the measurement data may be not only the energy consumption amount but also measurement data of an energy supply device such as a photovoltaic generator.

The explanatory variable past measurement data 352A includes data in the time series of a calendar day, data in the time series of a weather, data in the time series of an event causing a temporary variation in the energy demand or supply amount, social trend data, attribute data, and the like. The calendar day is a day type such as a month, a day of the week, a weekday, or a holiday and the weather is a temperature, a humidity, a temperature, a wind speed, a precipitation amount, a snowfall amount, and the like. The event that causes the temporary variation in the energy demand or supply amount is the presence or absence of typhoon landing or the presence or absence of an event such as a sports event and the social trend is a trend causing the variation in the energy demand amount or supply amount, such as industrial movement information. The attributes are information relating to the customer such as a type of the energy supply contract of the consumer, an industry type, a building type, and a floor area.

(3-2) Example of Application to Transportation Business Field Such as Taxi

Figure 18:
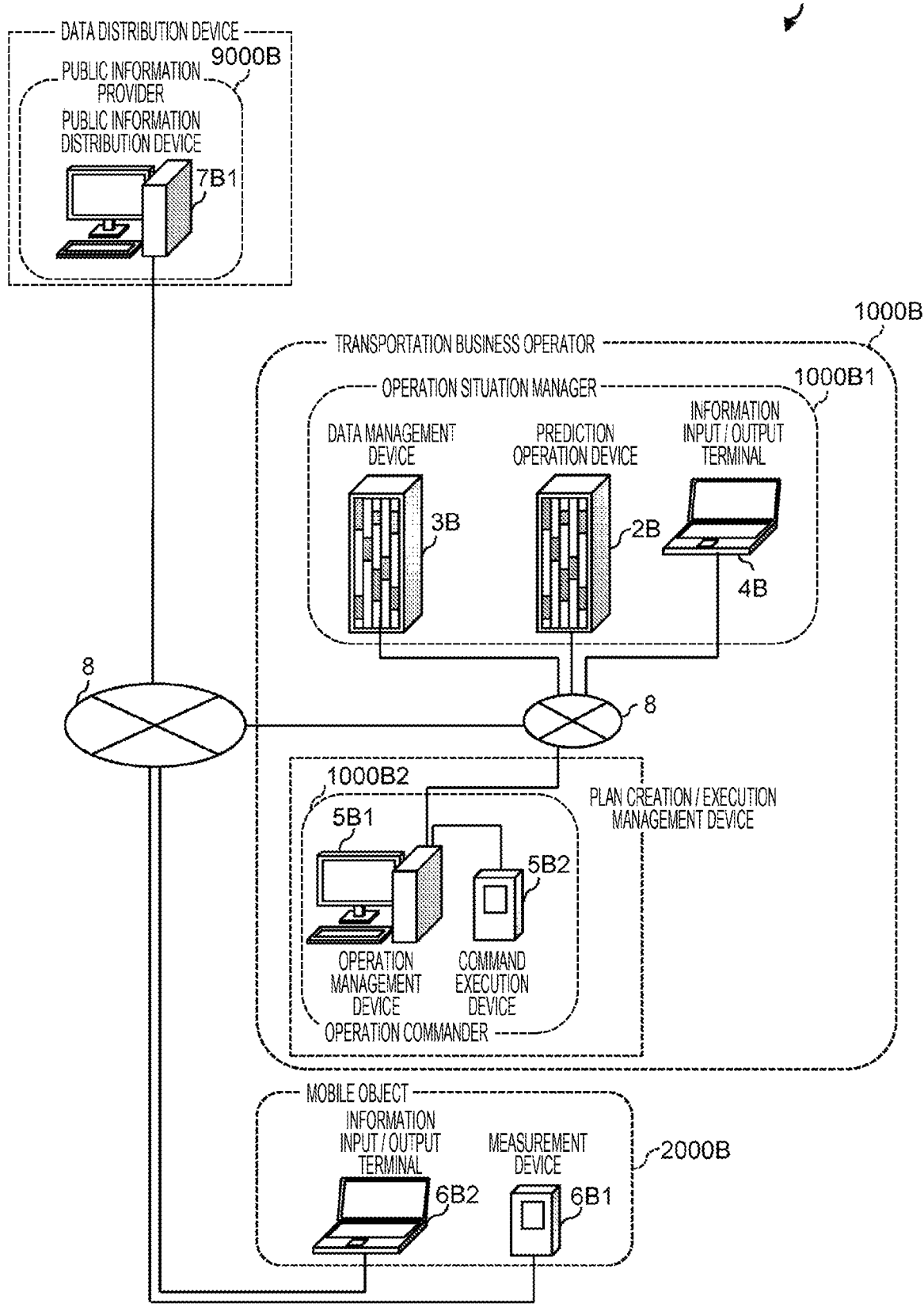
FIG. 18 is a diagram showing a device configuration according to another modification of the data management system.

Next, an embodiment of the case where the data management system 1 is applied to a transportation business field such as a taxi will be described with reference to FIG. 18.

A data management system 1B calculates a prediction value in time series of a transportation demand amount in a predetermined future period in a business office unit, a plurality of business offices, or a specific place or area. The data management system 1B is a system for generating and executing an operation plan of a facility capable of being operated, for example, a facility such as the taxi, on the basis of the calculated transportation demand amount. The data management system 1B includes a transportation business operator 1000B, a public information provider 9000B, a mobile object 2000B, and various devices and terminals of these components.

The transportation business operator 1000B is a business operator including an operation situation manager 1000B1 and an operation commander 1000B2. The operation situation manager 1000B1 is a department or a person in charge of predicting a future transportation demand amount for every 30 minutes, for example. The future transportation demand amount is predicted on the basis of time-series data of a past transportation demand amount and factor data such as a temporary event. The transportation demand amount is measured in a business office unit, a plurality of business offices, or a specific place or area. The temporary event is, for example, a sports event capable of explaining a variation of the transportation demand amount.

The transportation situation manager 1000B1 includes a data management device 3, a prediction operation device 2B to calculate a prediction value of the transportation demand amount, and an information input/output terminal 4B to exchange data with these devices. The data management device 3 stores the time-series data of the measured past transportation demand amount and the factor data capable of explaining the variation of the transportation demand amount.

The operation commander 1000B2 is a department or a person in charge of drafting and executing an operation plan of the transportation facility such as the taxi. The operation commander 1000B2 includes an operation management device 5B1 to transmit an instruction for managing facility information and drafting and executing the operation plan of the facility and a command execution device 5B2. The command execution device 5B2 receives the instruction from the operation management device 5B1 and actually executes it or assists execution thereof.

The public information provider 9000B is a business operator who provides information of the presence or the absence of a sports event or the like, past history information on the weather, such as a temperature, a humidity, an atmospheric pressure, a wind speed, a precipitation amount, and a snowfall amount, future prediction information, and the like. The public information provider 9000B includes a public information distribution device 7B to distribute the past history information and the prediction information.

The mobile object 2000B is a facility for performing transportation and includes an information input/output terminal 6B2 and a measurement device 6B1 to measure the transportation demand amount at predetermined time intervals and transmit it to the data management device 3B or the prediction operation device 2B. The information input/output terminal 6B2 transmits, to the transportation business operator 1000B, information affecting a transportation situation such as a location of the facility.

The above is an example of a device configuration in the embodiment of the case where the data management system 1 is applied to the transportation business field. The processing of each device and the processing unit of each device in the present embodiment is the same as the processing in the embodiment already disclosed.

However, in the present embodiment, the prediction target past measurement data 351A is past measurement data of the transportation demand amount in the time series measured in a business office unit, a plurality of business offices, or a specific place or area.

In addition, the explanatory variable past measurement data 352A is data in the time series of a calendar day, data in the time series of a weather, or data in the time series of a factor causing a variation in the transportation demand amount such as the presence or absence of typhoon landing or the presence or absence of a sports event.

(3-3) Example of Application to Communication Business Field

Figure 19:
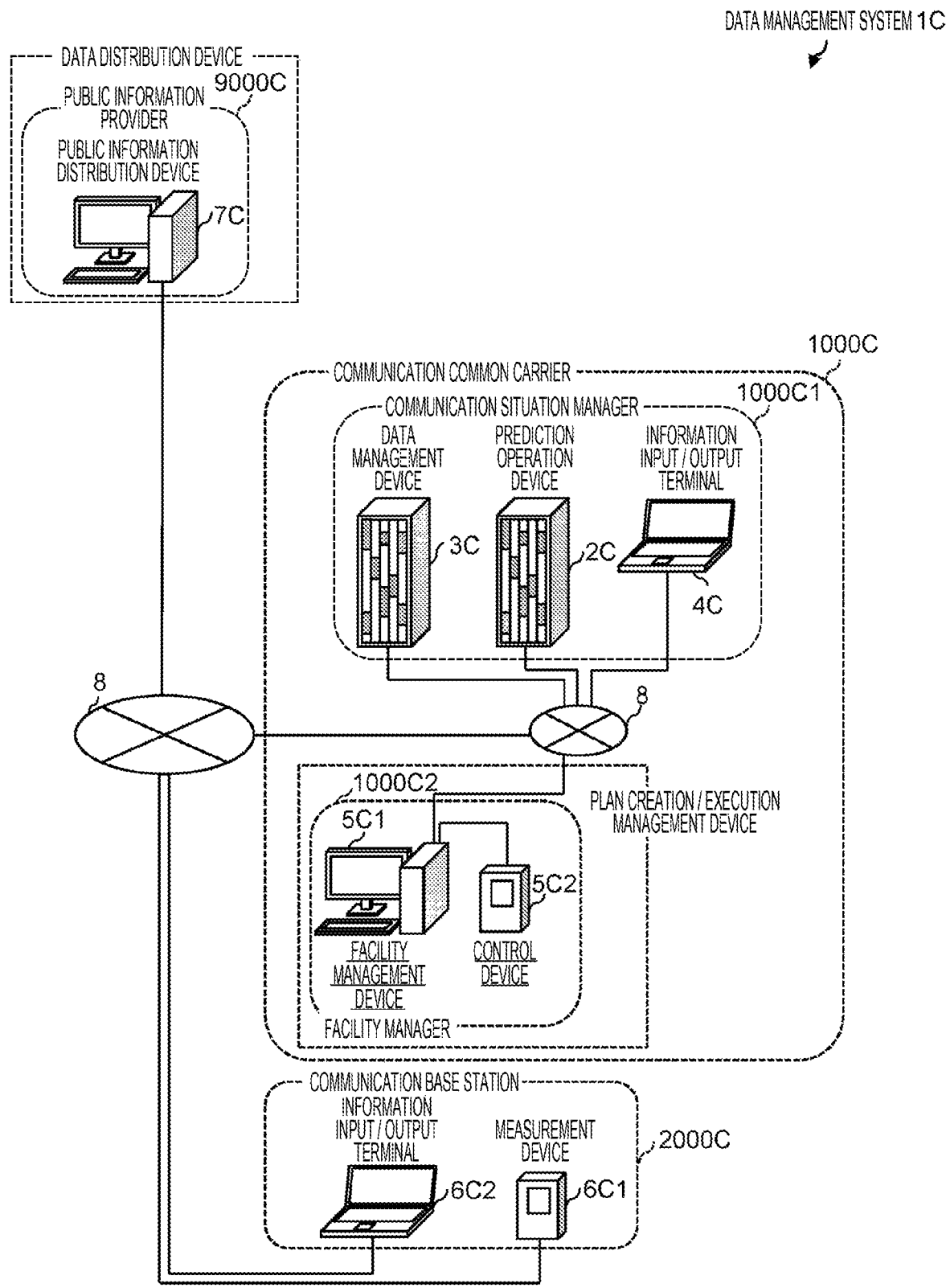
FIG. 19 is a diagram showing a device configuration according to other modification of the data management system.

Next, an embodiment of the case where the data management system 1 is applied to a telecommunication business will be described with reference to FIG. 19.

A data management system 1C calculates a prediction value in time series of a data communication amount in a predetermined future period in a base station unit, a plurality of base stations. The data management system 1C is a system for generating and executing an operation plan of a facility capable of being operated, for example, a facility such as an exchange machine, on the basis of the calculated data communication amount. The data management system 1C includes a communication business operator 1000C, a public information provider 9000C, a base station 2000C, and various devices and terminals of these components. The communication business operator 1000C is a business operator including a communication situation manager 1000C1 and a facility manager 1000C2.

The communication business operator 1000C1 is a department or a person in charge of predicting a future data communication amount for every 30 minutes, for example, on the basis of time-series data of a past data communication amount and factor data such as a temporary event. The past data communication amount is measured in a base station unit, a plurality of base stations, or a preset base station group. The temporary event is, for example, a sports event capable of explaining a variation of the data communication amount.

The communication situation manager 1000C1 includes a data management device 3C, a prediction operation device 2C to calculate a prediction value of the data communication amount, and an information input/output terminal 4C to exchange data with these devices. The data management device 3C stores the time-series data of the measured past data communication amount and the factor data capable of explaining the variation of the data communication amount.

The facility manager 1000C2 is a department or a person in charge of drafting and executing an operation plan of the data communication facility such as the exchange machine. The facility manager 1000C2 includes a facility management device 5C1 to transmit a control signal for managing facility information and drafting and executing the operation plan of the facility and a control device 5C2 to receive the control signal from the facility management device 5C1 and actually execute facility control.

The public information provider 9000C is a business operator who provides information of the presence or the absence of a sports event or the like, past history information on the weather, such as a temperature, a humidity, an atmospheric pressure, a wind speed, a precipitation amount, and a snowfall amount, future prediction information, and the like. The public information provider 9000C includes a public information distribution device 7C to distribute the past history information and the prediction information.

A base station 2000C is a facility for controlling the data communication and includes an information input/output terminal 6C2 and a measurement device 6C1 to measure the data communication amount at predetermined time intervals and transmit it to the data management device 3C or the prediction operation device 2C. The information input/output terminal 6C2 transmits, to the communication business operator 1000C, information affecting tendency of data communication such as a location of the facility.

The above is an example of a device configuration in the embodiment of the case where the data management system 1 is applied to the telecommunication business field. The processing of each device and the processing unit of each device in the present embodiment is the same as the processing in the embodiment already disclosed.

However, in the present embodiment, the prediction target past measurement data 351A is past measurement data of the data communication amount in the time series measured in a base station unit, a plurality of base stations, or a preset base station group.

In addition, the explanatory variable past measurement data 352A is data in the time series of a calendar day, data in the time series of a weather, or data in the time series of a factor causing a variation in the data communication amount such as the presence or absence of typhoon landing or the presence or absence of a sports event.

REFERENCE SIGNS LIST

1 data management system
2 prediction operation device
3 data management device
4 information input/output terminal
5 plan creation/execution management device
6 data observation device
7 data distribution device
8 communication path

The invention claimed is:

1. A data prediction system for calculating a prediction value, the data prediction system comprising:
   a data management device which manages data; and
   a prediction operation device,
   wherein the prediction operation device includes a processor coupled to a memory storing instructions to permit the processor to function as:
      a first prediction operation unit which operates the prediction value;
      a second prediction operation unit which operates a prediction value of an error of an operation result of the first prediction operation unit;
      a prediction correction unit which corrects the operation result of the first prediction operation unit using an operation result of the second prediction operation unit;
      a stationarity verification processing unit which verifies stationarity with respect to each prediction error time-series data relating to each of first prediction operation results calculated by a plurality of the first prediction operation unit operating prediction values; and
      a data selection unit which selects any one of the first prediction operation results on a basis of a verification result, and the prediction correction unit performs prediction correction from the first prediction operation result selected by the data selection unit and a second prediction operation result for a prediction error for the selected first prediction operation result.

2. The data prediction system according to claim 1, wherein the instructions further permit the processor to function as:
   a data generation unit which generates or acquires representative time-series data in a prediction period of prediction target data;
   a reference value calculation unit which calculates a reference value to correct the representative times-series data; and
   a prediction value calculation unit which corrects the calculated representative times-series data on the basis of the reference value and calculates a prediction value in the prediction period of the prediction target data.

3. The data prediction system according to claim 1, wherein the instructions further permit the processor to function as:
   a reference value calculation unit which calculates a maximum value, a minimum value, or prediction values of both the maximum value and the minimum value in a predetermined period of a prediction period of prediction target data; and
   a prediction value calculation unit which corrects representative time-series data in the prediction period of the prediction target data such that a maximum value, a minimum value, or prediction values of both the maximum value and the minimum value in a same period of the representative time-series data are matched with the maximum value, the minimum value, or the prediction values of both the maximum value and the minimum value calculated or a residual is minimized.

4. The data prediction system according to claim 1, wherein the instructions further permit the processor to function as:
   a reference value calculation unit which calculates a prediction value of an integration value in a predetermined period of a prediction period of prediction target data; and
   a prediction value calculation unit which corrects representative time-series data in the prediction period of the prediction target data such that an integration value of the representative time-series data is matched with the calculated integration value or a residual is minimized.

5. The data prediction system according to claim 1, wherein the instructions further permit the processor to function as:
   a data classification unit which classifies time-series data for each predetermined period unit of prediction target data, on the basis of an index value showing a periodic feature; and
   a data generation unit which generates a representative time-series data in the prediction period of the prediction target, from groups of the time-series data classified by the data classification unit.

6. The data prediction system according to claim 5, wherein the data generation unit gives a preset weight to each of the time-series data classified to place emphasis on the time-series data of a past period having a high correlation with the prediction period and generates the representative time-series data.

7. The data prediction system according to claim 5, wherein the prediction target data is a sum value of values measured by a plurality of data observation devices, the time-series data is data for each predetermined period measured by each of the data observation devices, and
   wherein the instructions further permit the processor to function as a prediction value calculation unit that operates a prediction value for each group from the groups of the time-series data classified by the data classification unit and calculates a summed prediction value of the prediction target data.

8. The data prediction system according to claim 1, wherein the second prediction operation unit includes a model identification unit which generates a model generated by time-series analysis from error time-series data to be a time-series data of an error of a first prediction value from a predetermined past time point and a prediction amount calculation unit which calculates a prediction amount of the error of the first prediction value in a predetermined period of a prediction period from the generated model.

9. The data prediction system according to claim 8, wherein the model identification unit gives a preset weight to each of the error time-series data to place emphasis on error time-series data of a past period having a high correlation with the prediction period and generates the model.

10. The data prediction system according to claim 1, wherein the second prediction operation unit includes a model identification unit which classifies error time-series data regarding a time transition of an error of a first prediction value for each predetermined period, on the basis of an index value showing a periodic feature of the error time-series data, and generates representative error time-series data of a prediction target in a prediction period from groups of the classified error time-series data and a prediction amount calculation unit which calculates a prediction value of an error of a first prediction operation result from the error time-series data.

11. A data prediction system for calculating a prediction value, the data prediction system comprising:
a data management device which manages data; and
a prediction operation device,
wherein the prediction operation device includes a processor coupled to a memory storing instructions to permit the processor to function as:
a first prediction operation unit which operates the prediction value;
a second prediction operation unit which operates a prediction value of an error of an operation result of the first prediction operation unit;
a prediction correction unit which corrects the operation result of the first prediction operation unit using an operation result of the second prediction operation unit;
a prediction value assumption unit which calculates a variation range in a prediction target period relating to a first prediction operation result corrected using each of first prediction operation results calculated by a plurality of the first prediction operation unit operating prediction values or a second prediction operation result;
a synthesis ratio calculation unit which calculates a proportional division ratio of each prediction value such that a variation range of a final prediction value in the prediction target period is minimized or becomes a predetermined value or less, on a basis of the variation range of each prediction value calculated by the prediction value assumption unit; and
a prediction value synthesis unit which calculates a weighted mean of the plurality of first prediction operation results using the proportional division ratio calculated by the synthesis ratio calculation unit and outputs the weighted mean as a prediction operation result.

12. A data prediction system for calculating a prediction value, the data prediction system comprising:
a data management device which manages data; and
a prediction operation device,
wherein the prediction operation device includes a processor coupled to a memory storing instructions to permit the processor to function as:
a first prediction operation unit which operates the prediction value;
a second prediction operation unit which operates a prediction value of an error of an operation result of the first prediction operation unit; and
a prediction correction unit which corrects the operation result of the first prediction operation unit using an operation result of the second prediction operation unit;
a prediction value assumption unit which calculates a representative value of a utility value in a prediction target period relating to a first prediction operation result corrected using each of first prediction operation results calculated by a plurality of the first prediction operation unit operating prediction values or a second prediction operation result or a variation range of the utility value;
a synthesis ratio calculation unit which calculates a proportional division ratio to maximize or minimize the representative value of the utility value or a proportional division ratio to cause the variation range of the utility value to be minimized or to become a predetermined value or less; and a prediction value synthesis unit which calculates a weighted mean of the plurality of first prediction operation results using the proportional division ratio calculated by the synthesis ratio calculation unit and outputs the weighted mean as a prediction operation result.

13. A data prediction system for calculating a prediction value, the data prediction system comprising:
a data management device which manages data; and
a prediction operation device,
wherein the prediction operation device includes a processor coupled to a memory storing instructions to permit the processor to function as:
a first prediction operation unit which operates the prediction value;
a second prediction operation unit which operates a prediction value of an error of an operation result of the first prediction operation unit; and
a prediction correction unit which corrects the operation result of the first prediction operation unit using an operation result of the second prediction operation unit;
a state learning unit which calculates state information to be a combination of attribute information relating to a first prediction operation result corrected using each of first prediction operation results calculated by a plurality of the first prediction operation unit operating prediction values or a second prediction operation result and information to designate a prediction error or a prediction operation result to be applied;
an application prediction operation result determination unit which selects the prediction operation result used in a prediction period, on a basis of the state information and prediction information of attribute information in the prediction period; and
a prediction operation result switching unit which outputs the selected prediction operation result as a prediction value.

14. The data prediction system according to claim 13, wherein the prediction operation device further includes a prediction operation result correction unit which corrects and outputs other prediction operation result such that other prediction operation result is matched with at least one of the prediction operation results in the prediction period calculated by two or more prediction operation units or a difference with one prediction operation result is minimized.

15. A data prediction system for calculating a prediction value, comprising:
a data management device which manages data; and
a prediction operation device,
wherein the prediction operation device includes a processor coupled to a memory storing instructions to permit the processor to function as:
a first prediction operation unit which operates the prediction value;
a second prediction operation unit which operates a prediction value of an error of an operation result of the first prediction operation unit; and
a prediction correction unit which corrects the operation result of the first prediction operation unit using an operation result of the second prediction operation unit;
an application prediction operation result determination unit which operates errors to be differences between a plurality of advance prediction operation results generated in advance from a plurality of the first prediction operation unit and immediately previous prediction operation results output from the plurality of the first prediction operation unit having performed an operation again after an advance prediction operation and selects a prediction operation result based on the advance prediction operation results causing an index relating to time series of the errors to become a predetermined value or less or to be minimized; and a prediction operation result switching unit which outputs the selected prediction operation result as a prediction value.

16. A data prediction system for calculating a prediction value, the data prediction system comprising:

a data management device which manages data; and a prediction operation device, wherein the prediction operation device includes a processor coupled to a memory storing instructions to permit the processor to function as:

a first prediction operation unit which operates the prediction value;

a second prediction operation unit which operates a prediction value of an error of an operation result of the first prediction operation unit; and a prediction correction unit which corrects the operation result of the first prediction operation unit using an operation result of the second prediction operation unit, wherein the instructions permits processor to function such that the first prediction operation unit includes a data classification unit which classifies time-series data for each predetermined period of prediction target data, on a basis of an index value showing a periodic feature, and a data generation unit which generates representative time-series data in the prediction period of the prediction target, from groups of the time-series data classified by the data classification unit, and wherein the instructions permits processor to function such that the data classification unit includes a metering point clustering unit which classifies the time-series data measured by a data observation device into a plurality of groups from a first index value showing a periodic feature of data measured in the data observation device and classifies data measured by a second data observation device having performed measurement in a second period less than a predetermined period into the groups of the data observation device from a distance between a second index value showing a representative periodic feature of each group in the second period and a third index value showing a periodic feature of the data measured by the second data observation device, and a prediction value calculation unit performs correction by a classification result of the metering point clustering unit, when a prediction value for each group of the time-series data is summed.

17. A method for a data prediction system for calculating a prediction value, the method comprising:

managing data with a data management device;

operating the prediction value through a first prediction operation unit of a prediction operation device;

operating a prediction value of an error of an operation result of the first prediction operation unit through a second prediction operation unit;

correcting, through a prediction correction unit, the operation result of the first prediction operation unit by using an operation result of the second prediction operation unit;

verifying, at a stationarity verification processing unit, stationarity with respect to each prediction error time-series data relating to each of a plurality of the first prediction operation result calculated by a plurality of the first prediction operation unit operating prediction values;

selecting any one of the first prediction operation results based on a verification result through a data selection unit; and performing prediction correction from the first prediction operation result selected by the data selection unit and a second prediction operation result for a prediction error for the selected first prediction operation result.

* * * * *